US010404389B2

(12) United States Patent
Li et al.

(10) Patent No.: US 10,404,389 B2
(45) Date of Patent: Sep. 3, 2019

(54) CHANNEL DETECTION METHOD, TERMINAL AND BASE STATION

(71) Applicant: YULONG COMPUTER TELECOMMUNICATION SCIENTIFIC (SHENZHEN) CO., LTD., Guangdong (CN)

(72) Inventors: Mingju Li, Guangdong (CN); Yajun Zhu, Guangdong (CN); Chenlu Zhang, Guangdong (CN); Yixue Lei, Guangdong (CN); Yunfei Zhang, Guangdong (CN)

(73) Assignee: NANCHANG COOLPAD INTELLIGENT TECHNOLOGY COMPANY LIMITED, Nanchang, Jiangxi Province (CN)

( * ) Notice: Subject to any disclaimer, the term of this patent is extended or adjusted under 35 U.S.C. 154(b) by 125 days.

(21) Appl. No.: 15/622,925

(22) Filed: Jun. 14, 2017

(65) Prior Publication Data

US 2018/0091242 A1 Mar. 29, 2018

Related U.S. Application Data

(63) Continuation of application No. PCT/CN2015/077975, filed on Apr. 30, 2015.

(30) Foreign Application Priority Data

Dec. 19, 2014 (CN) .......................... 2014 1 0803213

(51) Int. Cl.
*H04B 17/382* (2015.01)
*H04B 17/391* (2015.01)
(Continued)

(52) U.S. Cl.
CPC ......... *H04B 17/382* (2015.01); *H04B 17/318* (2015.01); *H04B 17/391* (2015.01);
(Continued)

(58) Field of Classification Search
None
See application file for complete search history.

(56) References Cited

U.S. PATENT DOCUMENTS 6,633,332 B1 10/2003 Nay et al.
2013/0203458 A1 8/2013 Charbit et al.
(Continued)

FOREIGN PATENT DOCUMENTS

CN 101179778 A 5/2008
CN 101765122 A 6/2010
(Continued)

OTHER PUBLICATIONS

International Search Report dated Sep. 22, 2015 issued in International Application No. PCT/CN2015/077975 and English Translation.

(Continued)

*Primary Examiner* — Charles C Jiang
*Assistant Examiner* — Saad Khawar
(74) *Attorney, Agent, or Firm* — Troutman Sanders LLP

(57) ABSTRACT

In one aspect of the disclosure, a channel detection method applied when an LTE system works in an unlicensed frequency band comprises determining a current sub-frame and a channel detection time when a data traffic arrives, wherein the channel detection time is set in at least one of the current sub-frame and a next adjacent sub-frame to perform channel state detection, and judging whether the terminal or base station that performs the channel state detection and other terminals or base stations belong to a same telecommunication operator in order to perform the channel state detec- (Continued)

tion in a corresponding way; and performing data traffic transmission when it is detected that the channel is in an idle state. Other aspects of the disclosure relates to a terminal and a base station using the channel detection method.

18 Claims, 5 Drawing Sheets

(51) Int. Cl.

| | |
|---|---|
| ***H04W 72/04*** | (2009.01) |
| ***H04W 16/14*** | (2009.01) |
| ***H04B 17/318*** | (2015.01) |
| *H04B 17/19* | (2015.01) |
| *H04B 17/24* | (2015.01) |
| *H04W 72/12* | (2009.01) |

(52) U.S. Cl.

CPC ....... *H04W 16/14* (2013.01); *H04W 72/0446* (2013.01); *H04B 17/19* (2015.01); *H04B 17/24* (2015.01); *H04W 72/0486* (2013.01); *H04W 72/1284* (2013.01)

(56) References Cited

U.S. PATENT DOCUMENTS

| | | | | |
|---|---|---|---|---|
| 2014/0044105 | A1 | 2/2014 | Bontu et al. | |
| 2015/0131536 | A1 | 5/2015 | Kaur et al. | |
| 2015/0334744 | A1* | 11/2015 | Ji | H04W 74/0816 370/336 |
| 2017/0195889 | A1* | 7/2017 | Takeda | H04W 16/14 |
| 2017/0325253 | A1* | 11/2017 | Wang | H04L 27/04 |
| 2017/0325263 | A1* | 11/2017 | Liu | H04W 16/14 |
| 2018/0279365 | A1* | 9/2018 | Wang | H04W 74/0808 |

FOREIGN PATENT DOCUMENTS

| | | | |
|---|---|---|---|
| CN | 103370896 | A | 10/2013 |
| CN | 103580840 | A | 2/2014 |
| CN | 104486013 | A | 4/2015 |
| JP | 2000354192 | A | 12/2000 |
| WO | 03105395 | A | 12/2003 |

OTHER PUBLICATIONS

Chinese First Office Action issued in CN 201410803213.8 dated May 12, 2016, including English Translation.

* cited by examiner

CHANNEL DETECTION METHOD, TERMINAL AND BASE STATION

CROSS-REFERENCE TO RELATED APPLICATIONS

The present invention is a continuation of International Application No. PCT/CN2015/077975, filed on Apr. 30, 2015, which was published as WO 2016/095397 on Jun. 23, 2016, and claims priority to Chinese Patent Application No. 201410803213.8, filed on Dec. 19, 2014, the entire contents of which are incorporated herein by reference in their entirety.

TECHNICAL FIELD

The present invention relates to the technical field of telecommunication, in particular relates to a channel detection method applied when an LTE system works in an unlicensed frequency band, a terminal and a base station.

BACKGROUND

As the telecommunication data traffic grows rapidly, the licensed frequency bands of 3GPP has a tendency of not being able to provide higher network throughput capacity. In order to increase the utilization rate of frequency band resources, it has been discussed for 3GPP to utilize an unlicensed frequency band such as the 2.4 GHz frequency band and 5 GHz frequency band under the help of a licensed frequency band. These unlicensed frequency bands are now mainly used by Wi-Fi, Bluetooth, radar, medical systems, etc.

Under normal circumstances, the access technology designed for a licensed frequency band, such as Long Term Evolution (LTE), is not suitable to be used in an unlicensed frequency band, because the access technology such as LTE has very high requirements for frequency band efficiency and user experience optimization. Whereas, the Carrier Aggregation (CA) function makes it possible for LTE to be deployed in an unlicensed frequency band. The concept of LTE Assisted Access (LAA) is proposed for 3GPP, which can utilize an unlicensed frequency band with the help of a licensed LTE frequency band. There are two working manners of the unlicensed frequency band, one of which is Supplemental Downlink (SDL) which only has downlink transmission sub-frames, and the other of which is the TDD mode which not only has downlink transmission sub-frames but also has uplink transmission sub-frames. The Supplemental Downlink can only be used with the help of Carrier Aggregation technology (as shown in FIG. 1). The TDD mode not only can be used with the help of Dual Connectivity (DC), but also can be used independently.

As compared to a Wi-Fi system, an LTE system working in an unlicensed frequency band is capable of providing higher frequency band efficiency and larger coverage, and in the meantime, based on the same core network, data traffic can be switched seamlessly between the licensed frequency band and the unlicensed frequency band. For users, this means better broadband experience, higher transmission speed, better stability and mobile convenience.

The access technology currently used in an unlicensed frequency band, such as Wi-Fi, has weak anti-interference ability. In order to prevent interference, many interference avoiding regulations have been designed for Wi-Fi systems, such as Carrier Sense Multiple Access/Collision Detection (CSMA/CD). The basic principle of this method is that, before a Wi-Fi Access Point (AP) or a terminal sends signal or data, it is first detected whether there is another AP or another terminal sending/receiving signal or data in the surrounding area, if there is, the detecting is kept on until it is detected that there is not; if there is not, a random number is generated as the avoiding period, and if no signal transmission or data transmission is detected during this avoiding period, then, after this avoiding period is over, the AP or terminal starts to send signal or data. This process is shown in FIG. 2.

But, it is the good orthogonality of the LTE network that guarantees the anti-interference level, so that the uplink and downlink transmission between a base station and a user does not need to consider whether there is another base station or another user transmitting data in the surrounding area. If the use of LTE in an unlicensed frequency band also does not consider whether there is another device using the unlicensed frequency band in the surrounding area, significant interference would be caused to Wi-Fi devices. Because LTE performs transmission whenever there is data traffic without any detecting regulations, the Wi-Fi devices cannot perform transmission when there is data traffic transmitted by LTE, and it is only after the LTE data traffic transmission is completed that the Wi-Fi devices can detect a channel idle state to perform data transmission.

Therefore, when an LTE network utilizes an unlicensed frequency band, one of the major key points is guaranteeing the LAA can coexist with the existing access technology (such as Wi-Fi) on a fair and friendly basis. But there is no Listen Before Talk (LBT) mechanism in the conventional LTE system to prevent collision. For better coexistence with the Wi-Fi system, the LTE system needs an LBT mechanism.

However, the already deployed LBT mechanisms all have a frame based LBT structure, as shown in FIG. 3, wherein the LBT cycle is fixed, and the Clear Channel Assessment period is at the beginning of every cycle. For example, in an LBT frame structure with a 10 ms cycle, the CCA takes one or more symbols at the front of the #0 sub-frame. In such frame structure with a fixed cycle, only the #0 sub-frame can be used for CCA, and if a data traffic arrives in the #1 sub-frame, the detection of whether the channel is available for use must wait until after CCA is performed in the #0 sub-frame of the next cycle, which brings large amount of time delay.

Thus, the technical problem that has to be solved urgently is how to effectively reduce the time delay of data traffic transmission due to channel state detection at a fixed detection period, on the premise that the normal working of the LTE system in the unlicensed frequency band is guaranteed, so as to improve data traffic transmission efficiency and at the same time achieve harmonious coexistence of the LTE system and other systems in the unlicensed frequency band.

SUMMARY OF THE INVENTION

In consideration of the above-mentioned problem, the present invention provides a novel technical solution which is a novel channel detection method applied when an LTE system works in an unlicensed frequency band, whereby, on the premise that the normal working of the LTE system in the unlicensed frequency band is guaranteed, the time delay of data traffic transmission due to channel state detection at a fixed detection period can be effectively reduced, so that data traffic transmission efficiency is improved and at the same time harmonious coexistence of the LTE system and other systems in the unlicensed frequency band is achieved.

Accordingly, one aspect of the present invention provides a channel detection method applied when an LTE system works in an unlicensed frequency band, comprising: determining a current sub-frame when a data traffic arrives, and setting a channel detection time in the current sub-frame and/or in a next adjacent sub-frame to perform channel state detection; and performing data traffic transmission when it is detected that the channel is in an idle state.

In this technical solution, an LBT mechanism based on load (data traffic) is defined, that is, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame. That is to say, whenever a data traffic arrives, channel state detection would be performed immediately, and once a channel idle state is detected, the data traffic transmission would be performed. By means of this, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

In the aforementioned technical solution, preferably, when the data traffic arrives, determining a current symbol of the current sub-frame, and setting the channel detection time within the current symbol and/or within a next adjacent symbol to perform the channel state detection.

In this technical solution, an LBT mechanism based on load is defined, that is, when a data traffic arrives, the position of a current symbol of the current sub-frame at the arriving time of this data traffic is determined, and a channel detection time is set in the current symbol or in a next adjacent symbol, irrespective of whether the current sub-frame is an uplink sub-frame, a downlink sub-frame or a special sub-frame, and irrespective of whether the current symbol is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. By means of this, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

In the aforementioned technical solution, preferably, setting a starting point of the channel detection time to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

In this technical solution, when a data traffic arrives, the channel state detection can be started at any moment, according to actual circumstances, the starting point of the channel detection time may be set at a starting point or middle point of the current sub-frame and/or of the next adjacent sub-frame, or may be set at a starting point or middle point of the current symbol and/or of the next adjacent symbol. Of course, the starting point of the channel detection time is arranged after the arriving time point of the data traffic. On the premise that the aforementioned condition is fulfilled, those skilled in the art should know that the starting point of the channel detection time may be set according to specific situations.

In the aforementioned technical solution, preferably, the channel detection time is repeated according to a fixed detection period.

In this technical solution, when a data traffic arrives and the first time of channel state detection detects a busy state, the channel detection time is set repeatedly according to a fixed detection period (such as 10 ms) until the channel state is detected to be an idle state, and then the data traffic transmission is performed, thereby achieving harmonious coexistence of the LTE system and other systems in the unlicensed frequency band.

In the aforementioned technical solution, preferably, the channel detection time is repeated according to a variable detection period.

In this technical solution, when a data traffic arrives, even if it is not in a channel detection time, the channel state detection still can be performed immediately, and if the first time of channel state detection detects a busy state, the channel detection time is set repeatedly according to a fixed detection period until the channel state is detected to be an idle state, and then the data traffic transmission is performed. On one hand, this can further reduce time delay of data traffic transmission; on the other hand, this can achieve harmonious coexistence of the LTE system and other systems in the unlicensed frequency band.

In the aforementioned technical solution, preferably, when the data traffic arrives, determining the channel detection time and performing one time of the channel state detection, and if the channel is detected to be in an idle state, performing the data traffic transmission; if the channel is detected to be in a busy state, continuing performing the channel state detection.

In the aforementioned technical solution, preferably, the step of continuing performing the channel state detection if the channel is detected to be in a busy state specifically comprises: randomly selecting an integer N from a range of 1 to q, and in each of several consecutive sub-frames after the sub-frame where the current channel detection time is set, performing the channel state detection according to the channel detection time, wherein, if the channel is detected to be in an idle state, subtracting 1 from the integer N; if the channel is detected to be in a busy state, keeping the integer N unchanged; until the integer N is reduced to 0, and then performing the data traffic transmission.

In this technical solution, a method for performing channel state detection according to a variable detection period is defined, that is: when the data traffic arrives, determining the channel detection time and performing one time of the channel state detection, and if the channel is detected to be in an idle state, performing the data traffic transmission; if the channel is detected to be in a busy state, randomly selecting an integer N from a range of 1 to q, and in each of several consecutive sub-frames after the sub-frame where the current channel detection time is set, repeatedly setting the channel detection time to perform the channel state detection, wherein, every time when the channel is detected to be in an idle state, subtracting 1 from N; every time when the channel is detected to be in a busy state, keeping N unchanged; until N is reduced to 0, and then performing the data traffic transmission. That is to say, in this arrangement, the channel detection time is extended by a variable length, so as to get a variable channel detection period. By means of this technical solution, the channel state detection can be performed in several consecutive sub-frames, thereby further reducing the time delay of data traffic transmission and increasing the efficiency of data traffic transmission.

In the aforementioned technical solution, preferably, the value range of q is 4 to 32, and when performing the data traffic transmission, the channel occupied period is less than (13/32)*q.

In the aforementioned technical solution, preferably, before the data traffic arrives, setting channel detection time repeatedly according to a preset fixed detection period; when the data traffic arrives, after the channel detection time is determined, performing a first time of channel state detection, and if the channel is detected to be in an idle state, performing the data traffic transmission; if the channel is detected to be in a busy state, performing again the channel state detection when reaching a channel detection time point according to the preset fixed detection period, and repeatedly performing the channel state detection according to the preset fixed detection period until the channel is detected to be in an idle state, and then performing the data traffic transmission.

In this technical solution, another method for performing channel state detection according to a variable detection period is defined, that is: before the data traffic arrives, the system has a frame based LBT frame structure, and the channel detection time is repeatedly set according to a preset fixed detection period (such as 10 ms) to perform the channel state detection; when the data traffic arrives, the channel detection time is set in the current sub-frame or in a next adjacent sub-frame to perform a first time of channel state detection, and if the channel is detected to be in a busy state, the channel state detection is performed once again when reaching a channel detection time point of the frame based LBT frame structure, and the subsequent channel state detection is performed according to the preset fixed detection period until the channel is detected to be in an idle state. That is to say, a load based LBT frame structure is superimposed on a frame based LBT frame structure, so that the system performs channel state detection according to a variable detection period, thereby, the time delay of data traffic transmission is further reduced and the efficiency of data traffic transmission is increased.

Of course, those skilled in the art should know that, when an LTE system works in an unlicensed frequency band, the methods for performing channel state detection according to a variable detection period based on load are not limited to the above-mentioned two types; and whether to perform channel state detection according to a fixed detection period or a variable detection period can be determined in consideration of particular circumstances, so as to increase the diversity and choice flexibility of channel state detection methods, with enhanced applicability.

In the aforementioned technical solution, preferably, when the data traffic is a downlink data traffic, downlink channel state detection is performed by a base station; and when the data traffic is an uplink data traffic, uplink channel state detection is performed by a terminal or a base station.

In the aforementioned technical solution, preferably, when the base station performs the uplink channel state detection, judging whether an idle state of the uplink channel is known to the terminal and/or the base station, and if it is judged that the idle state of the uplink channel is known to the terminal and/or the base station, performing the uplink data traffic transmission; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

In this technical solution, when a downlink data traffic arrives, the base station performs downlink channel state detection in accordance with the channel detection method of any one of the technical solutions discussed above; when an uplink data traffic arrives, uplink channel state detection can be performed by either the terminal or the base station in accordance with the channel detection method of any one of the technical solutions discussed above.

When the base station performs the uplink channel state detection, first judging whether an idle state of the uplink channel is known to the terminal or the base station, and if an idle state is already known, for example, if the downlink channel is currently detected to be in an idle state and the downlink channel state can represent the uplink channel state, then the uplink channel is deemed to be in an idle state, thus, the terminal can immediately perform the uplink data traffic transmission; if an idle state is not known, for example, if the downlink channel is currently in an idle state but the downlink channel state cannot represent the uplink channel state, or if there is currently no downlink data traffic, or if the downlink channel state is undetermined, then, it requires the terminal to notify the base station of the arrival of an uplink data traffic beforehand and request the base station to perform channel state detection, wherein the method for the terminal notifying the base station of the arrival of an uplink data traffic includes, but not limited to: sending a detection reference signal in short cycles to the base station, sending an uplink scheduling request signal to the base station, or sending a cache status report to the base station, wherein the uplink scheduling request signal or the cache status report can be sent either in an unlicensed frequency band or in a licensed frequency band.

In the aforementioned technical solution, preferably, when the channel detection time is over and the channel is detected to be in an idle state, immediately performing the data traffic transmission, wherein the start time of the data traffic transmission includes a middle point of a symbol or a middle point of a sub-frame.

In the aforementioned technical solution, preferably, when the channel detection time is over at a point located at a middle point of a current symbol, starting to perform the data traffic transmission at a starting point of a symbol or sub-frame next to the current symbol, and transmitting a resource reservation signal or a channel idle state indication signal between the middle point of the current symbol and the starting point of the symbol or sub-frame next to the current symbol.

In this technical solution, when the channel detection time is over and the channel is detected to be in an idle state, the current time point may be a middle point of a symbol, and the start time of data traffic transmission may be one of the following two conditions: one condition is immediately performing the data traffic transmission, wherein the start time of the data traffic transmission includes, but not limited to, a middle point of the symbol or sub-frame where the channel state detection is performed, thus, the time delay of data traffic transmission is further reduced; another condition is starting to perform the data traffic transmission at a starting point of a symbol or sub-frame next to the current symbol where the channel state detection is finished, and transmitting a channel occupation signal such as a resource reservation signal or a channel idle state indication signal in the intermediate time period, thereby facilitating data transmission.

In the aforementioned technical solution, preferably, when setting the channel detection time in the current sub-frame or in the current symbol to perform channel state detection, judging whether the terminal or base station that performs the channel state detection belongs to the same telecommunication operator as the other terminals or base stations.

In the aforementioned technical solution, preferably, if it is judged that the terminal or base station that performs the channel state detection belongs to the same telecommunication operator as the other terminals or base stations, subtracting a second power of the other terminals or base stations from a first power detected by said terminal or base station that performs the channel state detection, so as to attain a third power, and comparing the third power with a first channel busy-idle threshold value in order to perform the channel state detection; or, setting a second channel busy-idle threshold value according to the distribution of all the base stations belonging to the same telecommunication operator, and comparing the power detected by the terminal or base station with the second channel busy-idle threshold value in order to perform the channel state detection, wherein the second channel busy-idle threshold value includes the power of the other terminals or base stations.

In the aforementioned technical solution, preferably, when setting the channel detection time in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

In this technical solution, when the data traffic arrives, the channel detection time is set in the current sub-frame or in the current symbol, and when performing channel state detection, the following three mechanisms are used to prevent misjudging of a channel state due to that the power detected by the terminal or base station that performs the channel state detection includes the power of other terminals or base stations which belong to the same telecommunication operator and concurrently perform data traffic transmission:

Firstly, judging whether the terminal or base station that performs the channel state detection belongs to the same telecommunication operator as the other terminals or base stations, and if it is judged that they belong to the same telecommunication operator, one of the following two mechanisms are adopted:

The first mechanism is that, subtracting the power of said other terminals or base stations belonging to the same telecommunication operator from the power detected by the terminal or base station that performs the channel state detection, and the result power value is compared with a channel busy-idle threshold value, thus, the accuracy of the channel state detection result is effectively improved, so as to prevent misjudging of a channel state.

The second mechanism is that, setting a reasonable channel busy-idle threshold value according to the distribution of all the base stations belonging to the same telecommunication operator, for example, when all the base stations belonging to the same telecommunication operator are relatively far from one another, the value range of the power of said other terminals or base stations received by the terminal or base station that performs the channel state detection can be determined and taken into account when setting the channel busy-idle threshold value, so as to make the channel state detection result more accurate as a result of comparing the power detected by the terminal or base station that performs the channel state detection with this channel busy-idle threshold value, thereby preventing misjudging of a channel state.

Of course, the above-mentioned problem can also be solved by adopting a third mechanism which sends channel occupation signals on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved.

Wherein, the distribution of subcarriers belonging to the same telecommunication operator may be either concentrated type or distributed type.

In the aforementioned technical solution, preferably, if downlink data traffic arrives at a base station when the terminal is performing uplink data traffic transmission, starting to perform the channel state detection at a time point that is less than or equal to 4 ms after the arriving time of the downlink data traffic; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the base station performs the channel state detection, the detected power includes the power of the subcarriers used to send the channel occupation signals by the telecommunication operators and/or WIFIs other than the same telecommunication operator that the terminal or the base station belongs to.

In this technical solution, when downlink data traffic arrives at a base station and channel state detection is required to be performed while a terminal is sending uplink data traffic at the same time, if the base station performs downlink channel state detection at this time, the detected power will increase, which leads to inaccuracy of the downlink channel state detection result. Under such circumstances, one of the following two mechanisms can be used to prevent misjudging of a channel state and thus improve the accuracy of the channel state detection result:

The first mechanism is that, before the downlink data traffic arrives at the base station, the base station has already sent uplink authorization permission to those terminals having uplink data traffic demands, and those terminals can transmit (send) uplink data traffic, therefore, in order to avoid the situation that there is a terminal transmitting uplink data traffic when the base station is performing downlink channel state detection, the base station can be configured to perform the channel state detection at a time point that is delayed for less than or equal to 4 ms, according to actual circumstances, after the arriving time of the downlink data traffic, and meanwhile the base station is guaranteed not to send uplink authorization permission to any terminal, wherein 4 ms is a maximum acceptable delay time, thus, the accuracy of channel state detection can be effectively improved.

The second mechanism is that, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

In the aforementioned technical solution, preferably, if uplink data traffic arrives at a terminal when a base station that the terminal belongs to is performing downlink data traffic transmission or another terminal adjacent the terminal is performing uplink data traffic transmission, uplink channel state detection is performed by this terminal, wherein the power of said base station or the power of said another terminal adjacent this terminal is subtracted from the power detected by this terminal in order to perform the uplink channel state detection; or, waiting until said base station completes the downlink data traffic transmission or said another terminal adjacent this terminal completes the uplink data traffic transmission, and then uplink channel state detection is performed by this terminal; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal, and when the terminal performs the uplink channel state detection, the detected power includes the power of the subcarriers used to send the channel occupation signals by the telecommunication operators and/or WIFIs other than the same telecommunication operator that the terminal belongs to.

In this technical solution, when uplink data traffic arrives at a terminal while the base station which this terminal belongs to is transmitting (sending) downlink data traffic or another terminal adjacent this terminal is sending uplink data traffic, if this terminal performs uplink channel state detection at this time, the power detected by this terminal will increase, which leads to inaccuracy of the uplink channel state detection result. Under such circumstances, the following mechanisms can be used to prevent misjudging of a channel state and thus improve the accuracy of the channel state detection result:

The power of said base station which this terminal belongs to or the power of said another terminal adjacent this terminal is subtracted from the power detected by this terminal, and then the channel state is judged, so that the accuracy of the channel state detection result is improved.

Or, alternatively, the channel state detection is performed after said base station which this terminal belongs to has completed the downlink data traffic transmission or said another terminal adjacent this terminal has completed the uplink data traffic transmission, so that the accuracy of the channel state detection result is improved.

Or, alternatively, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

Another aspect of the present invention provides a channel detection system applied when an LTE system works in an unlicensed frequency band, comprising a first setting module for determining a current sub-frame when a data traffic arrives, and setting a channel detection time in the current sub-frame and/or in a next adjacent sub-frame to perform channel state detection; and a data transmission module for performing data traffic transmission when it is detected that the channel is in an idle state.

In this technical solution, an LBT mechanism based on load (data traffic) is defined, that is, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame. That is to say, whenever a data traffic arrives, channel state detection would be performed immediately, and once a channel idle state is detected, the data traffic transmission would be performed. By means of this, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

In the aforementioned technical solution, preferably, the first setting module is further for determining a current symbol of the current sub-frame when the data traffic arrives, and setting the channel detection time within the current symbol and/or within a next adjacent symbol to perform the channel state detection.

In this technical solution, an LBT mechanism based on load is defined, that is, when a data traffic arrives, the position of a current symbol of the current sub-frame at the arriving time of this data traffic is determined, and a channel detection time is set in the current symbol or in a next adjacent symbol, irrespective of whether the current sub-frame is an uplink sub-frame, a downlink sub-frame or a special sub-frame, and irrespective of whether the current symbol is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. By means of this, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

In the aforementioned technical solution, preferably, the first setting module is further for setting a starting point of the channel detection time to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

In this technical solution, when a data traffic arrives, the channel state detection can be started at any moment, according to actual circumstances, the starting point of the channel detection time may be set at a starting point or middle point of the current sub-frame and/or of the next adjacent sub-frame, or may be set at a starting point or middle point of the current symbol and/or of the next adjacent symbol. Of course, the starting point of the channel detection time is arranged after the arriving time point of the data traffic. On the premise that the aforementioned condition is fulfilled, those skilled in the art should know that the starting point of the channel detection time may be set according to specific situations.

In the aforementioned technical solution, preferably, the channel detection time is repeated according to a fixed detection period.

In this technical solution, when a data traffic arrives and the first time of channel state detection detects a busy state, the channel detection time is set repeatedly according to a fixed detection period (such as 10 ms) until the channel state is detected to be an idle state, and then the data traffic transmission is performed, thereby achieving harmonious coexistence of the LTE system and other systems in the unlicensed frequency band.

In the aforementioned technical solution, preferably, the channel detection time is repeated according to a variable detection period.

In this technical solution, when a data traffic arrives, even if it is not in a channel detection time, the channel state detection still can be performed immediately, and if the first time of channel state detection detects a busy state, the channel detection time is set repeatedly according to a fixed detection period until the channel state is detected to be an idle state, and then the data traffic transmission is performed. On one hand, this can further reduce time delay of data traffic transmission; on the other hand, this can achieve harmonious coexistence of the LTE system and other systems in the unlicensed frequency band.

In the aforementioned technical solution, preferably, when the data traffic arrives, the first setting module is for determining the channel detection time and performing one time of the channel state detection, and if it is detected that the channel is in an idle state, the data transmission module is for performing the data traffic transmission; if the channel is detected to be in a busy state, the first setting module is for continuing performing the channel state detection.

In the aforementioned technical solution, preferably, the channel detection system further comprises a selecting module for randomly selecting an integer N from a range of 1 to q when the channel is detected to be in a busy state; and the first setting module is also for performing the channel state detection according to the channel detection time in each of several consecutive sub-frames after the sub-frame where the current channel detection time is set; the channel detection system further comprises a calculation module for subtracting 1 from the integer N if the channel is detected to be in an idle state, and keeping the integer N unchanged if the channel is detected to be in a busy state, until the integer N is reduced to 0; and then, the data traffic transmission is performed by the data transmission module.

In this technical solution, a method for performing channel state detection according to a variable detection period is defined, that is: when the data traffic arrives, determining the channel detection time and performing one time of the channel state detection, and if the channel is detected to be in an idle state, performing the data traffic transmission; if the channel is detected to be in a busy state, randomly selecting an integer N from a range of 1 to q, and in each of several consecutive sub-frames after the sub-frame where the current channel detection time is set, repeatedly setting the channel detection time to perform the channel state detection, wherein, every time when the channel is detected to be in an idle state, subtracting 1 from N; every time when the channel is detected to be in a busy state, keeping N unchanged; until N is reduced to 0, and then performing the data traffic transmission. That is to say, in this arrangement, the channel detection time is extended by a variable length, so as to get a variable channel detection period. By means of this technical solution, the channel state detection can be performed in several consecutive sub-frames, thereby further reducing the time delay of data traffic transmission and increasing the efficiency of data traffic transmission.

In the aforementioned technical solution, preferably, the value range of q is 4 to 32, and when performing the data traffic transmission, the channel occupied period is less than (13/32)*q.

In the aforementioned technical solution, preferably, the channel detection system further comprises a second setting module for setting channel detection time repeatedly according to a preset fixed detection period before the data traffic arrives; when the data traffic arrives, the first setting module is for performing a first time of channel state detection after the channel detection time is determined, and the data transmission module is for performing the data traffic transmission if the channel is detected to be in an idle state; if the channel is detected to be in a busy state, the second setting module is further for performing again the channel state detection when reaching a channel detection time point according to the preset fixed detection period, and repeatedly performing the channel state detection according to the preset fixed detection period until the channel is detected to be in an idle state, and then the data traffic transmission is performed by the data transmission module.

In this technical solution, another method for performing channel state detection according to a variable detection period is defined, that is: before the data traffic arrives, the system has a frame based LBT frame structure, and the channel detection time is repeatedly set according to a preset fixed detection period (such as 10 ms) to perform the channel state detection; when the data traffic arrives, the channel detection time is set in the current sub-frame or in a next adjacent sub-frame to perform a first time of channel state detection, and if the channel is detected to be in a busy state, the channel state detection is performed once again when reaching a channel detection time point of the frame based LBT frame structure, and the subsequent channel state detection is performed according to the preset fixed detection period until the channel is detected to be in an idle state. That is to say, a load based LBT frame structure is superimposed on a frame based LBT frame structure, so that the system performs channel state detection according to a variable detection period, thereby, the time delay of data traffic transmission is further reduced and the efficiency of data traffic transmission is increased.

Of course, those skilled in the art should know that, when an LTE system works in an unlicensed frequency band, the methods for performing channel state detection according to a variable detection period based on load are not limited to the above-mentioned two types; and whether to perform channel state detection according to a fixed detection period or a variable detection period can be determined in consideration of particular circumstances, so as to increase the diversity and choice flexibility of channel state detection methods, with enhanced applicability.

In the aforementioned technical solution, preferably, when the data traffic is a downlink data traffic, downlink channel state detection is performed by a base station; and when the data traffic is an uplink data traffic, uplink channel state detection is performed by a terminal or a base station.

In the aforementioned technical solution, preferably, the channel detection system further comprises a judging module for judging whether an idle state of the uplink channel is known to the terminal and/or the base station when the base station performs the uplink channel state detection; if it is judged that the idle state of the uplink channel is known to the terminal and/or the base station, the data transmission module is for performing the uplink data traffic transmission; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

In this technical solution, when a downlink data traffic arrives, the base station performs downlink channel state detection in accordance with the channel detection method of any one of the technical solutions discussed above; when an uplink data traffic arrives, uplink channel state detection can be performed by either the terminal or the base station in accordance with the channel detection method of any one of the technical solutions discussed above.

When the base station performs the uplink channel state detection, it is first judged whether an idle state of the uplink channel is known to the terminal or the base station, and if an idle state is already known, for example, if the downlink channel is currently detected to be in an idle state and the downlink channel state can represent the uplink channel state, then the uplink channel is deemed to be in an idle state, thus, the terminal can immediately perform the uplink data traffic transmission; if an idle state is not known, for example, if the downlink channel is currently in an idle state but the downlink channel state cannot represent the uplink channel state, or if there is currently no downlink data traffic, or if the downlink channel state is undetermined, then, it requires the terminal to notify the base station of the arrival of an uplink data traffic beforehand and request the base station to perform channel state detection, wherein the method for the terminal notifying the base station of the arrival of an uplink data traffic includes, but not limited to, sending a detection reference signal in short cycles to the base station, sending an uplink scheduling request signal to the base station, or sending a cache status report to the base station, wherein the uplink scheduling request signal or the cache status report can be sent either in an unlicensed frequency band or in a licensed frequency band.

In the aforementioned technical solution, preferably, when the channel detection time is over and the channel is detected to be in an idle state, the data transmission module is also for immediately performing the data traffic transmission, wherein the start time of the data traffic transmission includes a middle point of a symbol or a middle point of a sub-frame.

In the aforementioned technical solution, preferably, when the channel detection time is over at a point located at a middle point of a current symbol, the data transmission module is also for starting to perform the data traffic transmission at a starting point of a symbol or sub-frame next to the current symbol; and, the channel detection system further comprises a signal transmission module for transmitting a resource reservation signal or a channel idle state indication signal between the middle point of the current symbol and the starting point of the symbol or sub-frame next to the current symbol.

In this technical solution, when the channel detection time is over and the channel is detected to be in an idle state, the current time point may be a middle point of a symbol, and the start time of data traffic transmission may be one of the following two conditions: one condition is immediately performing the data traffic transmission, wherein the start time of the data traffic transmission includes, but not limited to, a middle point of the symbol or sub-frame where the channel state detection is performed, thus, the time delay of data traffic transmission is further reduced; another condition is starting to perform the data traffic transmission at a starting point of a symbol or sub-frame next to the current symbol where the channel state detection is finished, and transmitting a channel occupation signal such as a resource reservation signal or a channel idle state indication signal in the intermediate time period, thereby facilitating data transmission.

In the aforementioned technical solution, preferably, when the channel detection time is set in the current sub-frame or in the current symbol to perform channel state detection, the judging module is also for judging whether the terminal or base station that performs the channel state detection belongs to the same telecommunication operator as the other terminals or base stations.

In the aforementioned technical solution, preferably, if it is judged that the terminal or base station that performs the channel state detection belongs to the same telecommunication operator as the other terminals or base stations, the calculation module is also for subtracting a second power of the other terminals or base stations from a first power of said terminal or base station that performs the channel state detection, so as to attain a third power; and the judging module is also for comparing the third power with a first channel busy-idle threshold value in order to perform the channel state detection; or, the channel detection system further comprises a third setting module for setting a second channel busy-idle threshold value according to the distribution of all the base stations belonging to the same telecommunication operator, and the judging module is also for comparing the power detected by the terminal or base station with the second channel busy-idle threshold value in order to perform the channel state detection, wherein the second channel busy-idle threshold value includes the power of the other terminals or base stations.

In the aforementioned technical solution, preferably, when setting the channel detection time in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

In this technical solution, when the data traffic arrives, the channel detection time is set in the current sub-frame or in the current symbol, and when channel state detection is performed, the following three mechanisms are used to prevent misjudging of a channel state due to that the power detected by the terminal or base station that performs the channel state detection includes the power of other terminals or base stations which belong to the same telecommunication operator and concurrently perform data traffic transmission:

Firstly, whether the terminal or base station that performs the channel state detection belongs to the same telecommunication operator as the other terminals or base stations is judged, and if it is judged that they belong to the same telecommunication operator, one of the following two mechanisms are adopted:

The first mechanism is that, subtracting the power of said other terminals or base stations belonging to the same telecommunication operator from the power detected by the terminal or base station that performs the channel state detection, and the result power value is compared with a channel busy-idle threshold value, thus, the accuracy of the channel state detection result is effectively improved, so as to prevent misjudging of a channel state.

The second mechanism is that, setting a reasonable channel busy-idle threshold value according to the distribution of all the base stations belonging to the same telecommunication operator, for example, when all the base stations belonging to the same telecommunication operator are relatively far from one another, the value range of the power of said other terminals or base stations received by the terminal or base station that performs the channel state detection can be determined and taken into account when setting the channel busy-idle threshold value, so as to make the channel state detection result more accurate as a result of comparing the power detected by the terminal or base station that performs the channel state detection with this channel busy-idle threshold value, thereby preventing misjudging of a channel state.

Of course, the above-mentioned problem can also be solved by adopting a third mechanism which sends channel occupation signals on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved.

Wherein, the distribution of subcarriers belonging to the same telecommunication operator may be either concentrated type or distributed type.

In the aforementioned technical solution, preferably, if downlink data traffic arrives at a base station when the terminal is performing uplink data traffic transmission, the first setting module is for starting to perform the channel state detection at a time point that is less than or equal to 4 ms after the arriving time of the downlink data traffic; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the base station performs the channel state detection, the detected power includes the power of the subcarriers used to send the channel occupation signals by the telecommunication operators and/or WIFIs other than the same telecommunication operator that the terminal or the base station belongs to.

In this technical solution, when downlink data traffic arrives at a base station and channel state detection is required to be performed while a terminal is sending uplink data traffic at the same time, if the base station performs downlink channel state detection at this time, the detected power will increase, which leads to inaccuracy of the downlink channel state detection result. Under such circumstances, one of the following two mechanisms can be used to prevent misjudging of a channel state and thus improve the accuracy of the channel state detection result:

The first mechanism is that, before the downlink data traffic arrives at the base station, the base station has already sent uplink authorization permission to those terminals having uplink data traffic demands, and those terminals can transmit (send) uplink data traffic, therefore, in order to avoid the situation that there is a terminal transmitting uplink data traffic when the base station is performing downlink channel state detection, the base station can be configured to perform the channel state detection at a time point that is delayed for less than or equal to 4 ms, according to actual circumstances, after the arriving time of the downlink data traffic, and meanwhile the base station is guaranteed not to send uplink authorization permission to any terminal, wherein 4 ms is a maximum acceptable delay time, thus, the accuracy of channel state detection can be effectively improved.

The second mechanism is that, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

In the aforementioned technical solution, preferably, if uplink data traffic arrives at a terminal when a base station that the terminal belongs to is performing downlink data traffic transmission or another terminal adjacent the terminal is performing uplink data traffic transmission, uplink channel state detection is performed by this terminal, and the calculation module is for subtracting the power of said base station or the power of said another terminal adjacent the terminal from the power detected by this terminal in order for the first setting module to perform the uplink channel state detection; or, uplink channel state detection is performed by this terminal after said base station completes the downlink data traffic transmission or said another terminal adjacent the terminal completes the uplink data traffic transmission; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the terminal performs the uplink channel state detection, the detected power includes the power of the subcarriers used to send the channel occupation signals by the telecommunication operators and/or WIFIs other than the same telecommunication operator that the terminal belongs to.

In this technical solution, when uplink data traffic arrives at a terminal while the base station which this terminal belongs to is transmitting (sending) downlink data traffic or another terminal adjacent this terminal is sending uplink data traffic, if this terminal performs uplink channel state detection at this time, the power detected by this terminal will increase, which leads to inaccuracy of the uplink channel state detection result. Under such circumstances, the following mechanisms can be used to prevent misjudging of a channel state and thus improve the accuracy of the channel state detection result:

The power of said base station which this terminal belongs to or the power of said another terminal adjacent this terminal is subtracted from the power detected by this terminal, and then the channel state is judged, so that the accuracy of the channel state detection result is improved.

Or, alternatively, the channel state detection is performed after said base station which this terminal belongs to has completed the downlink data traffic transmission or said another terminal adjacent this terminal has completed the uplink data traffic transmission, so that the accuracy of the channel state detection result is improved.

Or, alternatively, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

Another aspect of the present invention provides a terminal that comprises a communication bus, a network port, a memory and a processor, wherein: the communication bus is for communicably interconnecting the network port, the memory and the processor; the network port is for conducting data traffic transmission; the memory stores program codes, and execution of the program codes by the processor causes the processor to determine a current sub-frame when a data traffic arrives, and set a channel detection time in the current sub-frame and/or in a next adjacent sub-frame to perform channel state detection; and perform data traffic transmission when it is detected that the channel is in an idle state.

In the aforementioned technical solution, preferably, when the data traffic arrives, the processor is caused to determine a current symbol of the current sub-frame, and set the channel detection time within the current symbol and/or within a next adjacent symbol to perform the channel state detection.

In the aforementioned technical solution, preferably, the processor is caused to set a starting point of the channel detection time to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

In the aforementioned technical solution, preferably, the channel detection time is repeated according to a fixed detection period.

In the aforementioned technical solution, preferably, the channel detection time is repeated according to a variable detection period.

In the aforementioned technical solution, preferably, when the data traffic arrives, the processor is caused to determine the channel detection time and perform one time of the channel state detection, and if it is detected that the channel is in an idle state, perform the data traffic transmission; if the channel is detected to be in a busy state, continue performing the channel state detection.

In the aforementioned technical solution, preferably, before the data traffic arrives, the processor is caused to set channel detection time repeatedly according to a preset fixed detection period; when the data traffic arrives, after the channel detection time is determined, the processor is caused to perform a first time of channel state detection, and if the channel is detected to be in an idle state, perform the data traffic transmission; if the channel is detected to be in a busy state, perform again the channel state detection when reaching a channel detection time point according to the preset fixed detection period, and repeatedly perform the channel state detection according to the preset fixed detection period until the channel is detected to be in an idle state, and then perform the data traffic transmission.

In the aforementioned technical solution, preferably, when the data traffic is a downlink data traffic, downlink channel state detection is performed by a base station; and when the data traffic is an uplink data traffic, uplink channel state detection is performed by a terminal or a base station.

In the aforementioned technical solution, preferably, when the base station performs the uplink channel state detection, the processor is caused to judge whether an idle state of the uplink channel is known to the terminal and/or the base station, if it is judged that the idle state of the uplink channel is known to the terminal and/or the base station, the processor is caused to perform the uplink data traffic transmission; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

In the aforementioned technical solution, preferably, when the channel detection time is over and the channel is detected to be in an idle state, the processor is caused to immediately perform the data traffic transmission, wherein the start time of the data traffic transmission includes a middle point of a symbol or a middle point of a sub-frame.

In the aforementioned technical solution, preferably, when the channel detection time is over at a point located at a middle point of a current symbol, the processor is caused to start to perform the data traffic transmission at a starting point of a symbol or sub-frame next to the current symbol, and transmit a resource reservation signal or a channel idle state indication signal between the middle point of the current symbol and the starting point of the symbol or sub-frame next to the current symbol.

In the aforementioned technical solution, preferably, when setting the channel detection time in the current sub-frame or in the current symbol to perform channel state detection, the processor is caused to judge whether the terminal or base station that performs the channel state detection belongs to the same telecommunication operator as the other terminals or base stations.

In the aforementioned technical solution, preferably, if it is judged that the terminal or base station that performs the channel state detection belongs to the same telecommunication operator as the other terminals or base stations, the processor is caused to subtract a second power of the other terminals or base stations from a first power of said terminal or base station that performs the channel state detection, so as to attain a third power, and compare the third power with a first channel busy-idle threshold value in order to perform the channel state detection; or, set a second channel busy-idle threshold value according to the distribution of all the base stations belonging to the same telecommunication operator, and compare the power detected by the terminal or base station with the second channel busy-idle threshold value in order to perform the channel state detection, wherein the second channel busy-idle threshold value includes the power of the other terminals or base stations.

In the aforementioned technical solution, preferably, when setting the channel detection time in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

In the aforementioned technical solution, preferably, if downlink data traffic arrives at a base station when the terminal is performing uplink data traffic transmission, the processor is caused to start to perform the channel state detection at a time point that is less than or equal to 4 ms after the arriving time of the downlink data traffic; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the base station performs the channel state detection, the detected power includes the power of the subcarriers used to send the channel occupation signals by the telecommunication operators and/or WIFIs other than the same telecommunication operator that the terminal or the base station belongs to.

In the aforementioned technical solution, preferably, if uplink data traffic arrives at a terminal when a base station that the terminal belongs to is performing downlink data traffic transmission or another terminal adjacent the terminal is performing uplink data traffic transmission, uplink channel state detection is performed by this terminal, wherein the processor is caused to subtract the power of said base station or the power of said another terminal adjacent the terminal from the power detected by the terminal in order to perform the uplink channel state detection; or, waiting until said base station completes the downlink data traffic transmission or said another terminal adjacent the terminal completes the uplink data traffic transmission, and uplink channel state detection is performed by the terminal; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the terminal performs the uplink channel state detection, the detected power includes the power of the subcarriers used to send the channel occupation signals by the telecommunication operators and/or WIFIs other than the same telecommunication operator that the terminal belongs to.

In the aforementioned technical solution, by means of the channel detection system applied to a terminal while the associated LTE system works in an unlicensed frequency band, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame, and irrespective of whether the current symbol thereof is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. Therefore, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

Another aspect of the present invention provides a base station that comprises a communication bus, a network port, a memory and a processor, wherein: the communication bus is for communicably interconnecting the network port, the memory and the processor; the network port is for conducting data traffic transmission; the memory stores program codes, and execution of the program codes by the processor causes the processor to determine a current sub-frame when a data traffic arrives, and set a channel detection time in the current sub-frame and/or in a next adjacent sub-frame to perform channel state detection; and perform data traffic transmission through the network port when it is detected that the channel is in an idle state.

In the aforementioned technical solution, preferably, when the data traffic arrives, the operation of determining a current sub-frame when a data traffic arrives and setting a channel detection time in the current sub-frame and/or in a next adjacent sub-frame to perform channel state detection particularly comprises: determining a current symbol of the current sub-frame, and setting the channel detection time within the current symbol and/or within a next adjacent symbol to perform the channel state detection.

In the aforementioned technical solution, preferably, the processor is caused to set a starting point of the channel detection time to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

In the aforementioned technical solution, preferably, the channel detection time is repeated according to a fixed detection period.

In the aforementioned technical solution, preferably, the channel detection time is repeated according to a variable detection period.

In the aforementioned technical solution, preferably, when the data traffic arrives, the processor is caused to determine the channel detection time and perform one time of the channel state detection, and if it is detected that the channel is in an idle state, perform the data traffic transmission; if the channel is detected to be in a busy state, continue performing the channel state detection.

In the aforementioned technical solution, preferably, before the data traffic arrives, the processor is caused to set channel detection time repeatedly according to a preset fixed detection period; when the data traffic arrives, after the channel detection time is determined, the processor is caused to perform a first time of channel state detection, and if the channel is detected to be in an idle state, perform the data traffic transmission; if the channel is detected to be in a busy state, perform again the channel state detection when reaching a channel detection time point according to the preset fixed detection period, and repeatedly perform the channel state detection according to the preset fixed detection period until the channel is detected to be in an idle state, and then perform the data traffic transmission.

In the aforementioned technical solution, preferably, when the data traffic is a downlink data traffic, downlink channel state detection is performed by a base station; and when the data traffic is an uplink data traffic, uplink channel state detection is performed by a terminal or a base station.

In the aforementioned technical solution, preferably, when the base station performs the uplink channel state detection, the processor is caused to judge whether an idle state of the uplink channel is known to the terminal and/or the base station, and if it is judged that the idle state of the uplink channel is known to the terminal and/or the base station, the processor is caused to perform the uplink data traffic transmission; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

In the aforementioned technical solution, preferably, when the channel detection time is over and the channel is detected to be in an idle state, the processor is caused to immediately perform the data traffic transmission, wherein the start time of the data traffic transmission includes a middle point of a symbol or a middle point of a sub-frame.

In the aforementioned technical solution, preferably, when the channel detection time is over at a point located at a middle point of a current symbol, the processor is caused to start to perform the data traffic transmission at a starting point of a symbol or sub-frame next to the current symbol, and transmit a resource reservation signal or a channel idle state indication signal between the middle point of the current symbol and the starting point of the symbol or sub-frame next to the current symbol.

In the aforementioned technical solution, preferably, when setting the channel detection time in the current sub-frame or in the current symbol to perform channel state detection, the processor is caused to judge whether the terminal or base station that performs the channel state detection belongs to the same telecommunication operator as the other terminals or base stations.

In the aforementioned technical solution, preferably, if it is judged that the terminal or base station that performs the channel state detection belongs to the same telecommunication operator as the other terminals or base stations, the processor is caused to subtract a second power of the other terminals or base stations from a first power of said terminal or base station that performs the channel state detection, so as to attain a third power, and compare the third power with a first channel busy-idle threshold value in order to perform the channel state detection; or, set a second channel busy-idle threshold value according to the distribution of all the base stations belonging to the same telecommunication operator, and compare the power detected by the terminal or base station with the second channel busy-idle threshold value in order to perform the channel state detection, wherein the second channel busy-idle threshold value includes the power of the other terminals or base stations.

In the aforementioned technical solution, preferably, when setting the channel detection time in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

In the aforementioned technical solution, by means of the channel detection system applied to a base station while the associated LTE system works in an unlicensed frequency band, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame, and irrespective of whether the current symbol thereof is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. Therefore, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

By means of the technical solution of the present invention, on the premise that the normal working of the LTE system in the unlicensed frequency band is guaranteed, the time delay of data traffic transmission due to channel state detection at a fixed detection period can be effectively reduced, thereby improving data traffic transmission efficiency and at the same time achieving harmonious coexistence of the LTE system and other systems in the unlicensed frequency band.

DETAILED DESCRIPTION OF EMBODIMENTS

In order for the above-mentioned objectives, features and advantages of the present invention to be more clearly understood, hereinafter, detailed description of the present invention is further provided in combination with the accompanying drawings and specific embodiments. It needs to be noted that, as long as there is no conflict, the embodiments of the present invention as well as individual features in the embodiments can be combined with one another.

Many specific details are described hereinafter in order for the present invention to be fully understood, however, the present invention may also be implemented in other ways different from those described herein. Therefore, the protection scope of the present invention is not limited to the specific embodiments disclosed hereinafter.

Figure 1:
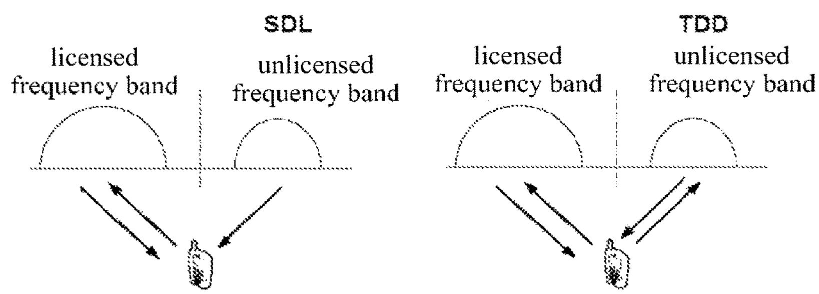
FIG. 1 shows a schematic diagram of two working modes on an unlicensed frequency band.
Figure 2:
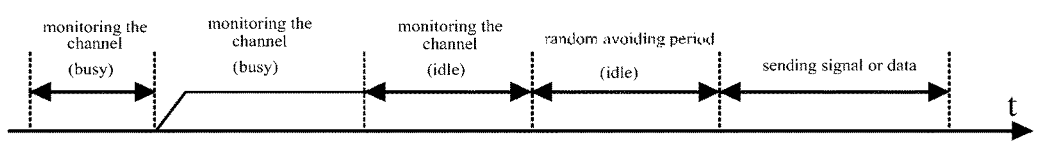
FIG. 2 shows a schematic diagram of the regulation for avoiding interference in a Wi-Fi system.
Figure 3:
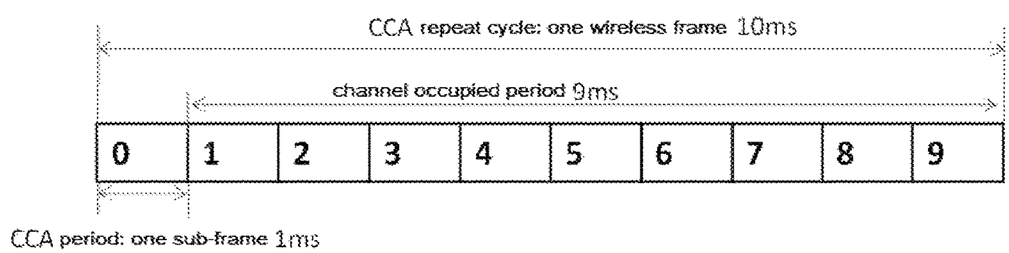
FIG. 3 shows a schematic diagram of a frame based LBT frame structure.
Figure 4:
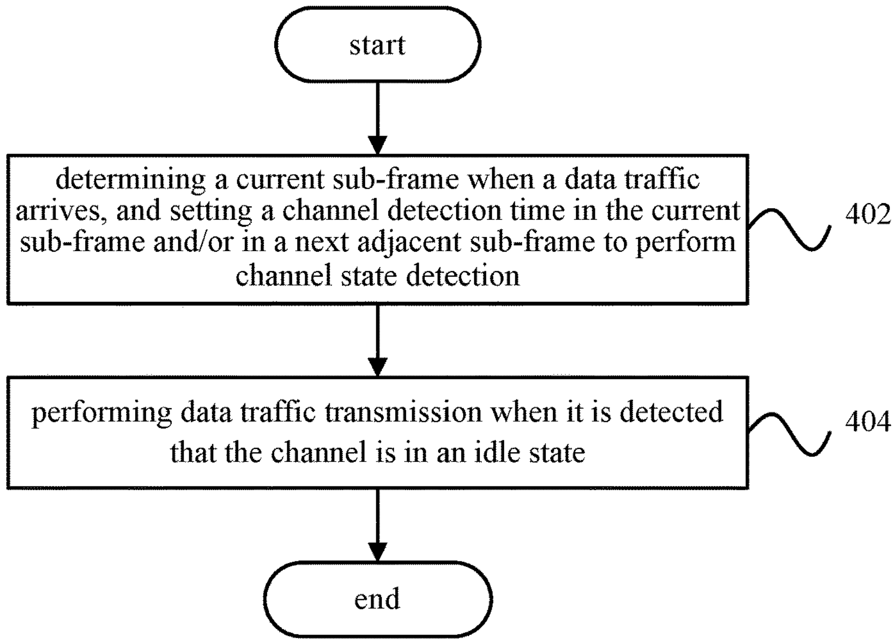
FIG. 4 shows a flow chart of a channel detection method applied when an LTE system works in an unlicensed frequency band according to an embodiment of the present invention.

FIG. 4 shows a flow chart of a channel detection method applied when an LTE system works in an unlicensed frequency band according to an embodiment of the present invention.

As shown in FIG. 4, the channel detection method applied when an LTE system works in an unlicensed frequency band according to this embodiment of the present invention comprises: Step 402, a current sub-frame is determined when a data traffic arrives, and a channel detection time is set in the current sub-frame and/or in a next adjacent sub-frame to perform channel state detection; and Step 404, data traffic transmission is performed when it is detected that the channel is in an idle state.

In this technical solution, an LBT mechanism based on load (data traffic) is defined, that is, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame. That is to say, whenever a data traffic arrives, channel state detection would be performed immediately, and once a channel idle state is detected, the data traffic transmission would be performed. Therefore, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

Figure 5:
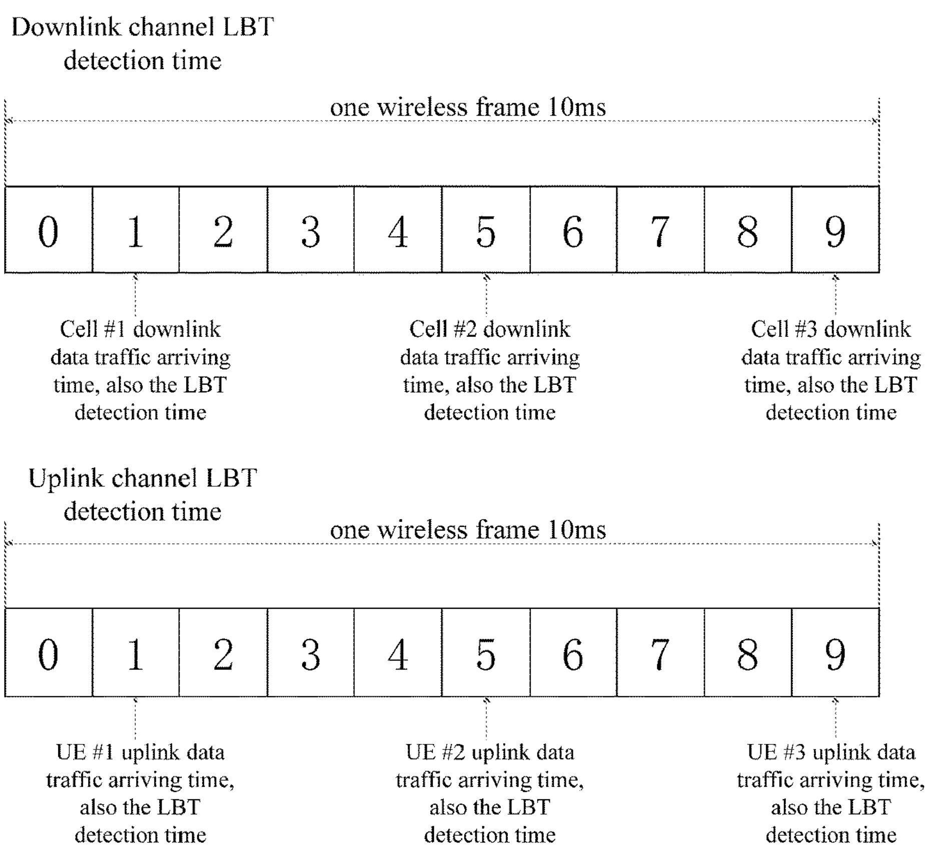
FIG. 5 shows a schematic diagram of a frame structure with the channel detection time set at the arriving time of data traffic according to an embodiment of the present invention.

FIG. 5 shows a schematic diagram of a frame structure with the channel detection time set at the arriving time of data traffic according to an embodiment of the present invention.

As shown in FIG. 5, in the frame structure with the channel detection time set at the arriving time of data traffic according to this embodiment of the present invention, the upper half of the drawing shows that, when downlink data traffic arrives, LBT downlink channel state detection is performed in the nearest sub-frame (that is, in the current sub-frame), irrespective of whether this particular sub-frame is an uplink sub-frame, a downlink sub-frame or a special sub-frame; the lower half of the drawing shows that, when uplink data traffic arrives, LBT uplink channel state detection is performed in the nearest sub-frame (that is, in the current sub-frame), irrespective of whether this particular sub-frame is an uplink sub-frame, a downlink sub-frame or a special sub-frame.

In the aforementioned technical solution, preferably, when the data traffic arrives, a current symbol of the current sub-frame is determined, and the channel detection time is set within the current symbol and/or within a next adjacent symbol to perform the channel state detection.

In this technical solution, an LBT mechanism based on load is defined, that is, when a data traffic arrives, the position of a current symbol of the current sub-frame at the arriving time of this data traffic is determined, and a channel detection time is set in the current symbol or in a next adjacent symbol, irrespective of whether the current sub-frame is an uplink sub-frame, a downlink sub-frame or a special sub-frame, and irrespective of whether the current symbol is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. Therefore, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

In the aforementioned technical solution, preferably, a starting point of the channel detection time is set to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

In this technical solution, when a data traffic arrives, the channel state detection can be started at any moment, according to actual circumstances, the starting point of the channel detection time may be set at a starting point or middle point of the current sub-frame and/or of the next adjacent sub-frame, or may be set at a starting point or middle point of the current symbol and/or of the next adjacent symbol. Of course, the starting point of the channel detection time is arranged after the arriving time point of the data traffic. On the premise that the aforementioned condition is fulfilled, those skilled in the art should know that the starting point of the channel detection time may be set according to specific situations.

In the aforementioned technical solution, preferably, the channel detection time is repeated according to a fixed detection period.

In this technical solution, when a data traffic arrives and the first time of channel state detection detects a busy state, the channel detection time is set repeatedly according to a fixed detection period (such as 10 ms) until the channel state is detected to be an idle state, and then the data traffic transmission is performed, thereby achieving harmonious coexistence of the LTE system and other systems in the unlicensed frequency band.

Figure 6:
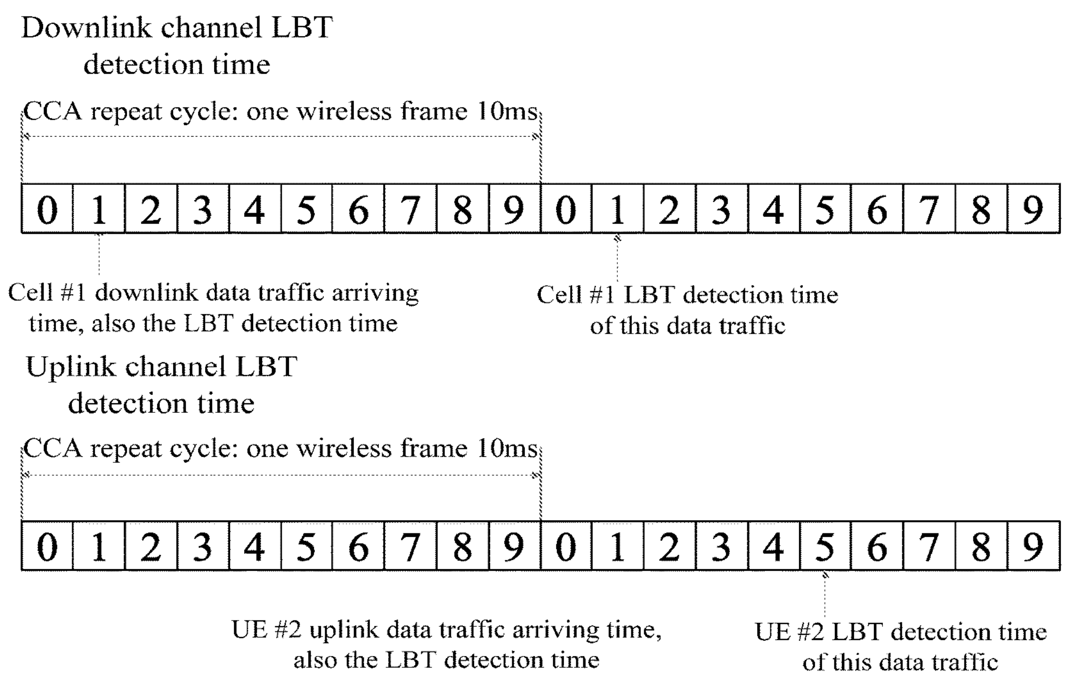
FIG. 6 shows a schematic diagram of a frame structure with the channel detection time repeated at a fixed detection period according to an embodiment of the present invention.

FIG. 6 shows a schematic diagram of a frame structure with the channel detection time repeated at a fixed detection period according to an embodiment of the present invention.

As shown in FIG. 6, in the frame structure with the channel detection time repeated at a fixed detection period according to this embodiment of the present invention, for cell#1, the data traffic arrives in the #1 sub-frame, and before the transmission of the data traffic is finished, all the CCA detection time are repeated at a fixed detection period, for example, the detection cycle shown in this drawing is 10 ms, that is, the CCA detection is performed in each #1 sub-frame. For UE#2, likewise, the data traffic arrives in the #5 sub-frame, and before the transmission of the data traffic is finished, all the CCA detection time are repeated at a fixed detection period, for example, the detection cycle shown in this drawing is 10 ms, that is, the CCA detection is performed in each #5 sub-frame.

In the aforementioned technical solution, preferably, the channel detection time is repeated according to a variable detection period.

In this technical solution, when a data traffic arrives, even if it is not in a channel detection time, the channel state detection still can be performed immediately, and if the first time of channel state detection detects a busy state, the channel detection time is set repeatedly according to a fixed detection period until the channel state is detected to be an idle state, and then the data traffic transmission is performed. On one hand, this can further reduce time delay of data traffic transmission; on the other hand, this can achieve harmonious coexistence of the LTE system and other systems in the unlicensed frequency band.

In the aforementioned technical solution, preferably, when the data traffic arrives, the channel detection time is determined and the channel state detection is performed for one time, and if the channel is detected to be in an idle state, the data traffic transmission is performed; if the channel is detected to be in a busy state, the channel state detection continues being performed.

In the aforementioned technical solution, preferably, the step of continuing performing the channel state detection if the channel is detected to be in a busy state specifically comprises: randomly selecting an integer N from a range of 1 to q, and in each of several consecutive sub-frames after the sub-frame where the current channel detection time is set, performing the channel state detection according to the channel detection time, wherein, if the channel is detected to be in an idle state, subtracting 1 from the integer N; if the channel is detected to be in a busy state, keeping the integer N unchanged; until the integer N is reduced to 0, and then performing the data traffic transmission.

In this technical solution, a method for performing channel state detection according to a variable detection period is defined, that is: when the data traffic arrives, determining the channel detection time and performing one time of the channel state detection, and if the channel is detected to be in an idle state, performing the data traffic transmission; if the channel is detected to be in a busy state, randomly selecting an integer N from a range of 1 to q, and in each of several consecutive sub-frames after the sub-frame where the current channel detection time is set, repeatedly setting the channel detection time to perform the channel state detection, wherein, every time when the channel is detected to be in an idle state, subtracting 1 from N; every time when the channel is detected to be in a busy state, keeping N unchanged; until N is reduced to 0, and then performing the data traffic transmission. That is to say, in this arrangement, the channel detection time is extended by a variable length, so as to get a variable channel detection period. By means of this technical solution, the channel state detection can be performed in several consecutive sub-frames, thereby further reducing the time delay of data traffic transmission and increasing the efficiency of data traffic transmission.

In the aforementioned technical solution, preferably, the value range of q is 4 to 32, and when the data traffic transmission is performed, the channel occupied period is less than (13/32)*q.

Figure 7:
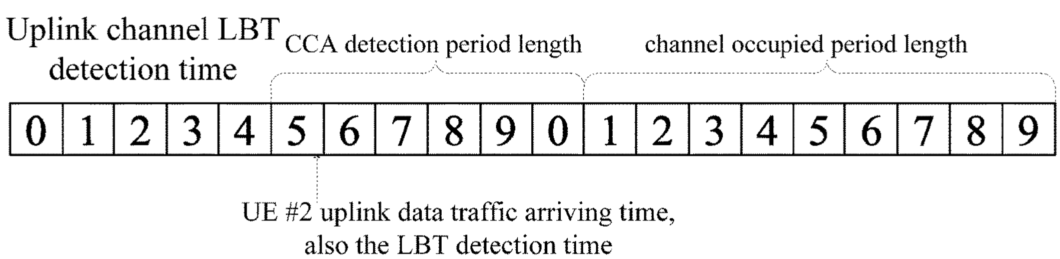
FIG. 7 shows a schematic diagram of one kind of frame structure with the channel detection time repeated at a variable detection period according to an embodiment of the present invention.

FIG. 7 shows a schematic diagram of one kind of frame structure with the channel detection time repeated at a variable detection period according to an embodiment of the present invention.

As shown in FIG. 7, in this kind of frame structure with the channel detection time repeated at a variable detection period according to this embodiment of the present invention, uplink channel state detection is illustrated as an example. For UE#2, the data traffic arrives in the #5 sub-frame, a first time of CCA detection is performed in the #5 sub-frame, and if the channel is detected to be in an idle state, the data traffic transmission is performed; if the channel is detected to be in a busy state, an extended CCA period is employed by randomly selecting an integer N from a range of 1 to q and setting N units of CCA detection times, and then, if a channel idle state is detected in a CCA detection time unit, it is performed by subtracting 1 from N, otherwise keeping N unchanged, until N is reduced to 0, and then the data traffic transmission is performed. The channel occupied period should be less than (13/32)*q. The value range of q is 4 to 32. That is to say, in this structure, the CCA detection period is extended for a variable length, with an undetermined channel occupied period, so this detection period is variable.

In the aforementioned technical solution, preferably, before the data traffic arrives, channel detection time is set repeatedly according to a preset fixed detection period; when the data traffic arrives, after the channel detection time is determined, a first time of channel state detection is performed, and if the channel is detected to be in an idle state, the data traffic transmission is performed; if the channel is detected to be in a busy state, the channel state detection is performed again when a channel detection time point is reached according to the preset fixed detection period, and the channel state detection is repeatedly performed according to the preset fixed detection period until the channel is detected to be in an idle state, and then the data traffic transmission is performed.

In this technical solution, another method for performing channel state detection according to a variable detection period is defined, that is: before the data traffic arrives, the system has a frame based LBT frame structure, and the channel detection time is repeatedly set according to a preset fixed detection period (such as 10 ms) to perform the channel state detection; when the data traffic arrives, the channel detection time is set in the current sub-frame or in a next adjacent sub-frame to perform a first time of channel state detection, and if the channel is detected to be in a busy state, the channel state detection is performed once again when reaching a channel detection time point of the frame based LBT frame structure, and the subsequent channel state detection is performed according to the preset fixed detection period until the channel is detected to be in an idle state. That is to say, a load based LBT frame structure is superimposed on a frame based LBT frame structure, so that the system performs channel state detection according to a variable detection period, thereby, the time delay of data traffic transmission is further reduced and the efficiency of data traffic transmission is increased.

Of course, those skilled in the art should know that, when an LTE system works in an unlicensed frequency band, the methods for performing channel state detection according to a variable detection period based on load are not limited to the above-mentioned two types; and whether to perform channel state detection according to a fixed detection period or a variable detection period can be determined in consideration of particular circumstances, so as to increase the diversity and choice flexibility of channel state detection methods, with enhanced applicability.

Figure 8:
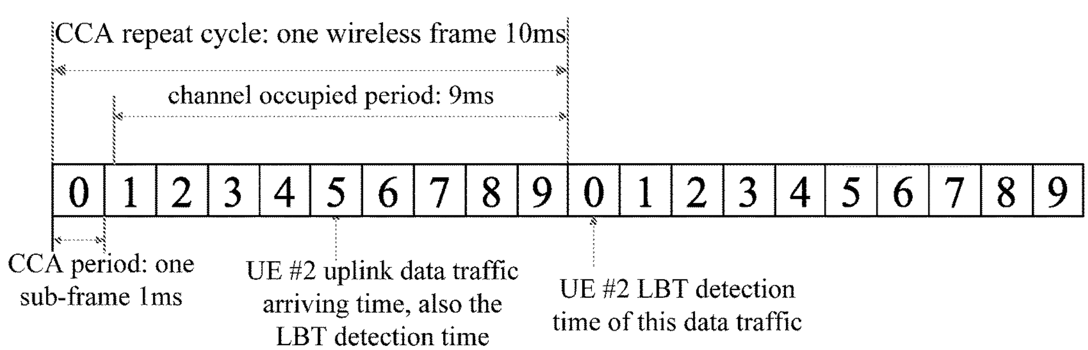
FIG. 8 shows a schematic diagram of another kind of frame structure with the channel detection time repeated at a variable detection period according to an embodiment of the present invention.

FIG. 8 shows a schematic diagram of another kind of frame structure with the channel detection time repeated at a variable detection period according to an embodiment of the present invention.

As shown in FIG. 8, in this kind of frame structure with the channel detection time repeated at a variable detection period according to this embodiment of the present invention, the system initially has a frame based LBT frame structure, for example, its LBT detection cycle is 10 ms, and each CCA (LBT) detection period is in the #0 sub-frame; for UE#2, the data traffic arrives in the #5 sub-frame, a first time of CCA detection is performed in the #5 sub-frame, and if the channel is detected to be in an idle state, the data traffic transmission is performed; if the channel is detected to be in a busy state, the data traffic transmission is not performed, and when it comes to the next CCA detection period, i.e. #0 sub-frame, in the frame based LBT frame structure, the channel busy-idle state detection is performed again, after that, the #0 sub-frame is always adopted as the CCA detection period, until a channel idle state is detected.

In the aforementioned technical solution, preferably, when the data traffic is a downlink data traffic, downlink channel state detection is performed by a base station; and when the data traffic is an uplink data traffic, uplink channel state detection is performed by a terminal or a base station.

In the aforementioned technical solution, preferably, when the base station performs the uplink channel state detection, whether an idle state of the uplink channel is known to the terminal and/or the base station is judged, and if it is judged that the idle state of the uplink channel is known to the terminal and/or the base station, the uplink data traffic transmission is performed; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

In this technical solution, when a downlink data traffic arrives, the base station performs downlink channel state detection in accordance with the channel detection method of any one of the technical solutions discussed above; when an uplink data traffic arrives, uplink channel state detection can be performed by either the terminal or the base station in accordance with the channel detection method of any one of the technical solutions discussed above.

When the base station performs the uplink channel state detection, whether an idle state of the uplink channel is known to the terminal or the base station is judged, and if an idle state is already known, for example, if the downlink channel is currently detected to be in an idle state and the downlink channel state can represent the uplink channel state, then the uplink channel is deemed to be in an idle state, thus, the terminal can immediately perform the uplink data traffic transmission; if an idle state is not known, for example, if the downlink channel is currently in an idle state but the downlink channel state cannot represent the uplink channel state, or if there is currently no downlink data traffic, or if the downlink channel state is undetermined, then, it requires the terminal to notify the base station of the arrival of an uplink data traffic beforehand and request the base station to perform channel state detection, wherein the method for the terminal notifying the base station of the arrival of an uplink data traffic includes, but not limited to: sending a detection reference signal in short cycles to the base station, sending an uplink scheduling request signal to the base station, or sending a cache status report to the base station, wherein the uplink scheduling request signal or the cache status report can be sent either in an unlicensed frequency band or in a licensed frequency band.

In the aforementioned technical solution, preferably, when the channel detection time is over and the channel is detected to be in an idle state, the data traffic transmission is immediately performed, wherein the start time of the data traffic transmission includes a middle point of a symbol or a middle point of a sub-frame.

In the aforementioned technical solution, preferably, when the channel detection time is over at a point located at a middle point of a current symbol, the data traffic transmission starts to be performed at a starting point of a symbol or sub-frame next to the current symbol, and transmitting a resource reservation signal or a channel idle state indication signal between the middle point of the current symbol and the starting point of the symbol or sub-frame next to the current symbol.

In this technical solution, when the channel detection time is over and the channel is detected to be in an idle state, the current time point may be a middle point of a symbol, and the start time of data traffic transmission may be one of the following two conditions: one condition is immediately performing the data traffic transmission, wherein the start time of the data traffic transmission includes, but not limited to, a middle point of the symbol or sub-frame where the channel state detection is performed, thus, the time delay of data traffic transmission is further reduced; another condition is starting to perform the data traffic transmission at a starting point of a symbol or sub-frame next to the current symbol where the channel state detection is finished, and transmitting a channel occupation signal such as a resource reservation signal or a channel idle state indication signal in the intermediate time period, thereby facilitating data transmission.

In the aforementioned technical solution, preferably, when the channel detection time is set in the current sub-frame or in the current symbol to perform channel state detection, whether the terminal or base station that performs the channel state detection belongs to the same telecommunication operator as the other terminals or base stations is judged.

In the aforementioned technical solution, preferably, if it is judged that the terminal or base station that performs the channel state detection belongs to the same telecommunication operator as the other terminals or base stations, a second power of the other terminals or base stations is subtracted from a first power detected by said terminal or base station that performs the channel state detection, so as to attain a third power, and comparing the third power with a first channel busy-idle threshold value in order to perform the channel state detection; or, a second channel busy-idle threshold value is set according to the distribution of all the base stations belonging to the same telecommunication operator, and the power detected by the terminal or base station is compared with the second channel busy-idle threshold value in order to perform the channel state detection, wherein the second channel busy-idle threshold value includes the power of the other terminals or base stations.

In the aforementioned technical solution, preferably, when the channel detection time is set in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

In this technical solution, when the data traffic arrives, the channel detection time is set in the current sub-frame or in the current symbol, and when performing channel state detection, the following three mechanisms are used to prevent from misjudging a channel state due to that the power detected by the terminal or base station that performs the channel state detection includes the power of other terminals or base stations which belong to the same telecommunication operator and concurrently perform data traffic transmission:

Firstly, whether the terminal or base station that performs the channel state detection belongs to the same telecommunication operator as the other terminals or base stations is judged, and if it is judged that they belong to the same telecommunication operator, one of the following two mechanisms are adopted:

The first mechanism is that, the power of said other terminals or base stations belonging to the same telecommunication operator is subtracted from the power detected by the terminal or base station that performs the channel state detection, and the result power value is compared with a channel busy-idle threshold value, thus, the accuracy of the channel state detection result is effectively improved, so as to prevent from misjudging a channel state.

The second mechanism is that, a reasonable channel busy-idle threshold value is set according to the distribution of all the base stations belonging to the same telecommunication operator, for example, when all the base stations belonging to the same telecommunication operator are relatively far from one another, the value range of the power of said other terminals or base stations received by the terminal or base station that performs the channel state detection can be determined and taken into account when the channel busy-idle threshold value is set, so as to make the channel state detection result more accurate as a result of comparing the power detected by the terminal or base station that performs the channel state detection with this channel busy-idle threshold value, thereby preventing from misjudging a channel state.

Of course, the above-mentioned problem can also be solved by adopting a third mechanism which sends channel occupation signals on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved.

Wherein, the distribution of subcarriers belonging to the same telecommunication operator may be either concentrated type or distributed type.

In the aforementioned technical solution, preferably, if downlink data traffic arrives at a base station when the terminal is performing uplink data traffic transmission, the channel state detection starts to be performed at a time point that is less than or equal to 4 ms after the arriving time of the downlink data traffic; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the base station performs the channel state detection, the detected power includes the power of the subcarriers used to send the channel occupation signals by the telecommunication operators and/or WIFIs other than the same telecommunication operator that the terminal or the base station belongs to.

In this technical solution, when downlink data traffic arrives at a base station and channel state detection is required to be performed while a terminal is sending uplink data traffic at the same time, if the base station performs downlink channel state detection at this time, the detected power will increase, which leads to inaccuracy of the downlink channel state detection result. Under such circumstances, one of the following two mechanisms can be used to prevent from misjudging a channel state and thus improve the accuracy of the channel state detection result:

The first mechanism is that, before the downlink data traffic arrives at the base station, the base station has already sent uplink authorization permission to those terminals having uplink data traffic demands, and those terminals can transmit (send) uplink data traffic, therefore, in order to avoid the situation that there is a terminal transmitting uplink data traffic when the base station is performing downlink channel state detection, the base station can be configured to perform the channel state detection at a time point that is delayed for less than or equal to 4 ms, according to actual circumstances, after the arriving time of the downlink data traffic, and meanwhile the base station is guaranteed not to send uplink authorization permission to any terminal, wherein 4 ms is a maximum acceptable delay time, thus, the accuracy of channel state detection can be effectively improved.

The second mechanism is that, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

In the aforementioned technical solution, preferably, if uplink data traffic arrives at a terminal when a base station that the terminal belongs to is performing downlink data traffic transmission or another terminal adjacent the terminal is performing uplink data traffic transmission, uplink channel state detection is performed by this terminal, wherein the power of said base station or the power of said another terminal adjacent this terminal is subtracted from the power detected by this terminal in order to perform the uplink channel state detection; or, after said base station completes the downlink data traffic transmission or said another terminal adjacent this terminal completes the uplink data traffic transmission, uplink channel state detection is performed by this terminal; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal, and when the terminal performs the uplink channel state detection, the detected power includes the power of the subcarriers used to send the channel occupation signals by the telecommunication operators and/or WIFIs other than the same telecommunication operator that the terminal belongs to.

In this technical solution, when uplink data traffic arrives at a terminal while the base station which this terminal belongs to is transmitting (sending) downlink data traffic or another terminal adjacent this terminal is sending uplink data traffic, if this terminal performs uplink channel state detection at this time, the power detected by this terminal will increase, which leads to inaccuracy of the uplink channel state detection result. Under such circumstances, the following mechanisms can be used to prevent misjudging of a channel state and thus improve the accuracy of the channel state detection result:

The power of said base station which this terminal belongs to or the power of said another terminal adjacent this terminal is subtracted from the power detected by this terminal, and then the channel state is judged, so that the accuracy of the channel state detection result is improved.

Or, alternatively, the channel state detection is performed after said base station which this terminal belongs to has completed the downlink data traffic transmission or said another terminal adjacent this terminal has completed the uplink data traffic transmission, so that the accuracy of the channel state detection result is improved.

Or, alternatively, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

Figure 9:
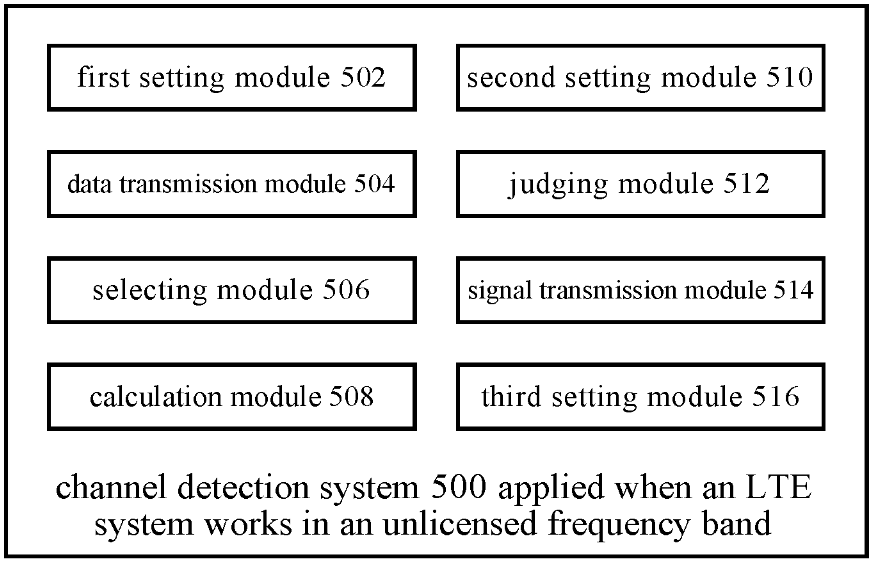
FIG. 9 shows a structural schematic diagram of a channel detection system applied when an LTE system works in an unlicensed frequency band according to an embodiment of the present invention.

FIG. 9 shows a structural schematic diagram of a channel detection system applied when an LTE system works in an unlicensed frequency band according to an embodiment of the present invention.

As shown in FIG. 9, the channel detection system 500 applied when an LTE system works in an unlicensed frequency band according to this embodiment of the present invention comprises: a first setting module 502 for determining a current sub-frame when a data traffic arrives, and setting a channel detection time in the current sub-frame and/or in a next adjacent sub-frame to perform channel state detection; and a data transmission module 504 for performing data traffic transmission when it is detected that the channel is in an idle state.

In this technical solution, an LBT mechanism based on load (data traffic) is defined, that is, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame. That is to say, whenever a data traffic arrives, channel state detection would be performed immediately, and once a channel idle state is detected, the data traffic transmission would be performed. By means of this, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

In the aforementioned technical solution, preferably, the first setting module 502 is further for determining a current symbol of the current sub-frame when the data traffic arrives, and setting the channel detection time within the current symbol and/or within a next adjacent symbol to perform the channel state detection.

In this technical solution, an LBT mechanism based on load is defined, that is, when a data traffic arrives, the position of a current symbol of the current sub-frame at the arriving time of this data traffic is determined, and a channel detection time is set in the current symbol or in a next adjacent symbol, irrespective of whether the current sub-frame is an uplink sub-frame, a downlink sub-frame or a special sub-frame, and irrespective of whether the current symbol is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. By means of this, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

In the aforementioned technical solution, preferably, the first setting module 502 is further for setting a starting point of the channel detection time to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

In this technical solution, when a data traffic arrives, the channel state detection can be started at any moment, according to actual circumstances, the starting point of the channel detection time may be set at a starting point or middle point of the current sub-frame and/or of the next adjacent sub-frame, or may be set at a starting point or middle point of the current symbol and/or of the next adjacent symbol. Of course, the starting point of the channel detection time is arranged after the arriving time point of the data traffic. On the premise that the aforementioned condition is fulfilled, those skilled in the art should know that the starting point of the channel detection time may be set according to specific situations.

In the aforementioned technical solution, preferably, the channel detection time is repeated according to a fixed detection period.

In this technical solution, when a data traffic arrives and the first time of channel state detection detects a busy state, the channel detection time is set repeatedly according to a fixed detection period (such as 10 ms) until the channel state is detected to be an idle state, and then the data traffic transmission is performed, thereby achieving harmonious coexistence of the LTE system and other systems in the unlicensed frequency band.

In the aforementioned technical solution, preferably, the channel detection time is repeated according to a variable detection period.

In this technical solution, when a data traffic arrives, even if it is not in a channel detection time, the channel state detection still can be performed immediately, and if the first time of channel state detection detects a busy state, the channel detection time is set repeatedly according to a fixed detection period until the channel state is detected to be an idle state, and then the data traffic transmission is performed. On one hand, this can further reduce time delay of data traffic transmission; on the other hand, this can achieve harmonious coexistence of the LTE system and other systems in the unlicensed frequency band.

In the aforementioned technical solution, preferably, when the data traffic arrives, the first setting module 502 is for determining the channel detection time and performing one time of the channel state detection, and if it is detected that the channel is in an idle state, the data transmission module 504 is for performing the data traffic transmission; if the channel is detected to be in a busy state, the first setting module 502 is for continuing performing the channel state detection.

In the aforementioned technical solution, preferably, the channel detection system further comprises a selecting module 506 for randomly selecting an integer N from a range of 1 to q when the channel is detected to be in a busy state; and the first setting module 502 is also for performing the channel state detection according to the channel detection time in each of several consecutive sub-frames after the sub-frame where the current channel detection time is set; the channel detection system further comprises a calculation module 508 for subtracting 1 from the integer N if the channel is detected to be in an idle state, and keeping the integer N unchanged if the channel is detected to be in a busy state, until the integer N is reduced to 0; and then, the data traffic transmission is performed by the data transmission module.

In this technical solution, a method for performing channel state detection according to a variable detection period is defined, that is: when the data traffic arrives, determining the channel detection time and performing one time of the channel state detection, and if the channel is detected to be in an idle state, performing the data traffic transmission; if the channel is detected to be in a busy state, randomly selecting an integer N from a range of 1 to q, and in each of several consecutive sub-frames after the sub-frame where the current channel detection time is set, repeatedly setting the channel detection time to perform the channel state detection, wherein, every time when the channel is detected to be in an idle state, subtracting 1 from N; every time when the channel is detected to be in a busy state, keeping N unchanged; until N is reduced to 0, and then performing the data traffic transmission. That is to say, in this arrangement, the channel detection time is extended by a variable length, so as to get a variable channel detection period. By means of this technical solution, the channel state detection can be performed in several consecutive sub-frames, thereby further reducing the time delay of data traffic transmission and increasing the efficiency of data traffic transmission.

In the aforementioned technical solution, preferably, the value range of q is 4 to 32, and when performing the data traffic transmission, the channel occupied period is less than (13/32)*q.

In the aforementioned technical solution, preferably, the channel detection system further comprises a second setting module 510 for setting channel detection time repeatedly according to a preset fixed detection period before the data traffic arrives; when the data traffic arrives, the first setting module 502 is for performing a first time of channel state detection after the channel detection time is determined, and the data transmission module 504 is for performing the data traffic transmission if the channel is detected to be in an idle state; if the channel is detected to be in a busy state, the second setting module 510 is further for performing again the channel state detection when reaching a channel detection time point according to the preset fixed detection period, and repeatedly performing the channel state detection according to the preset fixed detection period until the channel is detected to be in an idle state, and then the data traffic transmission is performed by the data transmission module 504.

In this technical solution, another method for performing channel state detection according to a variable detection period is defined, that is: before the data traffic arrives, the system has a frame based LBT frame structure, and the channel detection time is repeatedly set according to a preset fixed detection period (such as 10 ms) to perform the channel state detection; when the data traffic arrives, the channel detection time is set in the current sub-frame or in a next adjacent sub-frame to perform a first time of channel state detection, and if the channel is detected to be in a busy state, the channel state detection is performed once again when reaching a channel detection time point of the frame based LBT frame structure, and the subsequent channel state detection is performed according to the preset fixed detection period until the channel is detected to be in an idle state. That is to say, a load based LBT frame structure is superimposed on a frame based LBT frame structure, so that the system performs channel state detection according to a variable detection period, thereby, the time delay of data traffic transmission is further reduced and the efficiency of data traffic transmission is increased.

Of course, those skilled in the art should know that, when an LTE system works in an unlicensed frequency band, the methods for performing channel state detection according to a variable detection period based on load are not limited to the above-mentioned two types; and whether to perform channel state detection according to a fixed detection period or a variable detection period can be determined in consideration of particular circumstances, so as to increase the diversity and choice flexibility of channel state detection methods, with enhanced applicability.

In the aforementioned technical solution, preferably, when the data traffic is a downlink data traffic, downlink channel state detection is performed by a base station; and when the data traffic is an uplink data traffic, uplink channel state detection is performed by a terminal or a base station.

In the aforementioned technical solution, preferably, the channel detection system further comprises a judging module 512 for judging whether an idle state of the uplink channel is known to the terminal and/or the base station when the base station performs the uplink channel state detection; if it is judged that the idle state of the uplink channel is known to the terminal and/or the base station, the data transmission module 504 is for performing the uplink data traffic transmission; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

In this technical solution, when a downlink data traffic arrives, the base station performs downlink channel state detection in accordance with the channel detection method of any one of the technical solutions discussed above; when an uplink data traffic arrives, uplink channel state detection can be performed by either the terminal or the base station in accordance with the channel detection method of any one of the technical solutions discussed above.

When the base station performs the uplink channel state detection, whether an idle state of the uplink channel is known to the terminal or the base station is judged, and if an idle state is already known, for example, if the downlink channel is currently detected to be in an idle state and the downlink channel state can represent the uplink channel state, then the uplink channel is deemed to be in an idle state, thus, the terminal can immediately perform the uplink data traffic transmission; if an idle state is not known, for example, if the downlink channel is currently in an idle state but the downlink channel state cannot represent the uplink channel state, or if there is currently no downlink data traffic, or if the downlink channel state is undetermined, then, it requires the terminal to notify the base station of the arrival of an uplink data traffic beforehand and request the base station to perform channel state detection, wherein the method for the terminal notifying the base station of the arrival of an uplink data traffic includes, but not limited to: sending a detection reference signal in short cycles to the base station, sending an uplink scheduling request signal to the base station, or sending a cache status report to the base station, wherein the uplink scheduling request signal or the cache status report can be sent either in an unlicensed frequency band or in a licensed frequency band.

In the aforementioned technical solution, preferably, when the channel detection time is over and the channel is detected to be in an idle state, the data transmission module 504 is also for immediately performing the data traffic transmission, wherein the start time of the data traffic transmission includes a middle point of a symbol or a middle point of a sub-frame.

In the aforementioned technical solution, preferably, when the channel detection time is over at a point located at a middle point of a current symbol, the data transmission module 504 is also for starting to perform the data traffic transmission at a starting point of a symbol or sub-frame next to the current symbol; and, the channel detection system further comprises a signal transmission module 514 for transmitting a resource reservation signal or a channel idle state indication signal between the middle point of the current symbol and the starting point of the symbol or sub-frame next to the current symbol.

In this technical solution, when the channel detection time is over and the channel is detected to be in an idle state, the current time point may be a middle point of a symbol, and the start time of data traffic transmission may be one of the following two conditions: one condition is immediately performing the data traffic transmission, wherein the start time of the data traffic transmission includes, but not limited to, a middle point of the symbol or sub-frame where the channel state detection is performed, thus, the time delay of data traffic transmission is further reduced; another condition is starting to perform the data traffic transmission at a starting point of a symbol or sub-frame next to the current symbol where the channel state detection is finished, and transmitting a channel occupation signal such as a resource reservation signal or a channel idle state indication signal in the intermediate time period, thereby facilitating data transmission.

In the aforementioned technical solution, preferably, when the channel detection time is set in the current sub-frame or in the current symbol to perform channel state detection, the judging module 512 is also for judging whether the terminal or base station that performs the channel state detection belongs to the same telecommunication operator as the other terminals or base stations.

In the aforementioned technical solution, preferably, if it is judged that the terminal or base station that performs the channel state detection belongs to the same telecommunication operator as the other terminals or base stations, the calculation module 508 is also for subtracting a second power of the other terminals or base stations from a first power of said terminal or base station that performs the channel state detection, so as to attain a third power; and the judging module 512 is also for comparing the third power with a first channel busy-idle threshold value in order to perform the channel state detection; or, the channel detection system further comprises a third setting module 516 for setting a second channel busy-idle threshold value according to the distribution of all the base stations belonging to the same telecommunication operator, and the judging module 512 is also for comparing the power detected by the terminal or base station with the second channel busy-idle threshold value in order to perform the channel state detection, wherein the second channel busy-idle threshold value includes the power of the other terminals or base stations.

In the aforementioned technical solution, preferably, when the channel detection time is set in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

In this technical solution, when the data traffic arrives, the channel detection time is set in the current sub-frame or in the current symbol, and when channel state detection is performed, the following three mechanisms are used to prevent from misjudging a channel state due to that the power detected by the terminal or base station that performs the channel state detection includes the power of other terminals or base stations which belong to the same telecommunication operator and concurrently perform data traffic transmission:

Firstly, whether the terminal or base station that performs the channel state detection belongs to the same telecommunication operator as the other terminals or base stations is judged, and if it is judged that they belong to the same telecommunication operator, one of the following two mechanisms are adopted:

The first mechanism is that, the power of said other terminals or base stations belonging to the same telecommunication operator is subtracted from the power detected by the terminal or base station that performs the channel state detection, and the result power value is compared with a channel busy-idle threshold value, thus, the accuracy of the channel state detection result is effectively improved, so as to prevent misjudging of a channel state.

The second mechanism is that, a reasonable channel busy-idle threshold value is set according to the distribution of all the base stations belonging to the same telecommunication operator, for example, when all the base stations belonging to the same telecommunication operator are relatively far from one another, the value range of the power of said other terminals or base stations received by the terminal or base station that performs the channel state detection can be determined and taken into account when setting the channel busy-idle threshold value, so as to make the channel state detection result more accurate as a result of comparing the power detected by the terminal or base station that performs the channel state detection with this channel busy-idle threshold value, thereby preventing misjudging of a channel state.

Of course, the above-mentioned problem can also be solved by adopting a third mechanism which sends channel occupation signals on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved.

Wherein, the distribution of subcarriers belonging to the same telecommunication operator may be either concentrated type or distributed type.

In the aforementioned technical solution, preferably, if downlink data traffic arrives at a base station when the terminal is performing uplink data traffic transmission, the first setting module is for starting to perform the channel state detection at a time point that is less than or equal to 4 ms after the arriving time of the downlink data traffic; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the base station performs the channel state detection, the detected power includes the power of the subcarriers used to send the channel occupation signals by the telecommunication operators and/or WIFIs other than the same telecommunication operator that the terminal or the base station belongs to.

In this technical solution, when downlink data traffic arrives at a base station and channel state detection is required to be performed while a terminal is sending uplink data traffic at the same time, if the base station performs downlink channel state detection at this time, the detected power will increase, which leads to inaccuracy of the downlink channel state detection result. Under such circumstances, one of the following two mechanisms can be used to prevent from misjudging a channel state and thus improve the accuracy of the channel state detection result:

The first mechanism is that, before the downlink data traffic arrives at the base station, the base station has already sent uplink authorization permission to those terminals having uplink data traffic demands, and those terminals can transmit (send) uplink data traffic, therefore, in order to avoid the situation that there is a terminal transmitting uplink data traffic when the base station is performing downlink channel state detection, the base station can be configured to perform the channel state detection at a time point that is delayed for less than or equal to 4 ms, according to actual circumstances, after the arriving time of the downlink data traffic, and meanwhile the base station is guaranteed not to send uplink authorization permission to any terminal, wherein 4 ms is a maximum acceptable delay time, thus, the accuracy of channel state detection can be effectively improved.

The second mechanism is that, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

In the aforementioned technical solution, preferably, if uplink data traffic arrives at a terminal when a base station that the terminal belongs to is performing downlink data traffic transmission or another terminal adjacent the terminal is performing uplink data traffic transmission, uplink channel state detection is performed by this terminal, and the calculation module is for subtracting the power of said base station or the power of said another terminal adjacent the terminal from the power detected by this terminal in order for the first setting module to perform the uplink channel state detection; or, uplink channel state detection is performed by this terminal after said base station completes the downlink data traffic transmission or said another terminal adjacent the terminal completes the uplink data traffic transmission; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the terminal performs the uplink channel state detection, the detected power includes the power of the subcarriers used to send the channel occupation signals by the telecommunication operators and/or WIFIs other than the same telecommunication operator that the terminal belongs to.

In this technical solution, when uplink data traffic arrives at a terminal while the base station which this terminal belongs to is transmitting (sending) downlink data traffic or another terminal adjacent this terminal is sending uplink data traffic, if this terminal performs uplink channel state detection at this time, the power detected by this terminal will increase, which leads to inaccuracy of the uplink channel state detection result. Under such circumstances, the following mechanisms can be used to prevent from misjudging a channel state and thus improve the accuracy of the channel state detection result:

The power of said base station which this terminal belongs to or the power of said another terminal adjacent this terminal is subtracted from the power detected by this terminal, and then the channel state is judged, so that the accuracy of the channel state detection result is improved.

Or, alternatively, the channel state detection is performed after said base station which this terminal belongs to has completed the downlink data traffic transmission or said another terminal adjacent this terminal has completed the uplink data traffic transmission, so that the accuracy of the channel state detection result is improved.

Or, alternatively, channel occupation signals are sent on orthogonal frequency subcarriers, that is to say, when a telecommunication operator A occupies a channel, it sends a channel occupation signal on a subcarrier 1, and sending this channel occupation signal indicates that the telecommunication operator A occupies a full bandwidth; likewise, when another telecommunication operator or Wi-Fi occupies another channel, it also sends a channel occupation signal on a subcarrier 2 or a subcarrier 3, and it must send the channel occupation signal once it occupies any channel, while the subcarrier used to send the channel occupation signal can no longer be used to send any other signal. Therefore, when a terminal or a base station performs channel state detection, only the power of the subcarrier used to send the channel occupation signal by other telecommunication operators or WIFIs can be detected, and thus the detected power does not include the power of other terminals or base stations belonging to the same telecommunication operator as the terminal or base station that performs the channel state detection, so that the accuracy of channel state detection is effectively improved. Wherein, the distribution of subcarriers belonging to the same telecommunication operator may be either concentrated type or distributed type.

Figure 10:
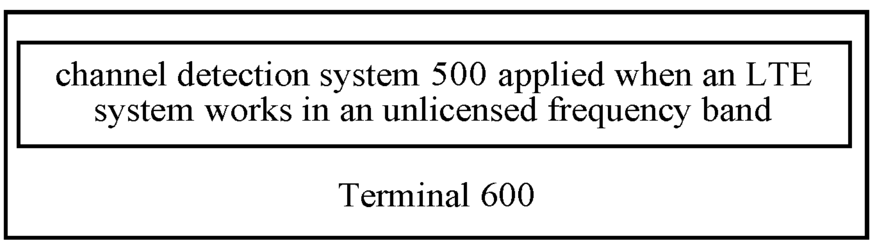
FIG. 10 shows a structural schematic diagram of a terminal according to an embodiment of the present invention.

FIG. 10 shows a structural schematic diagram of a terminal according to an embodiment of the present invention.

As shown in FIG. 10, the terminal 600 according to this embodiment of the present invention comprises a channel detection system 500 applied when an LTE system works in an unlicensed frequency band as described in any of the above technical solutions.

In this technical solution, by means of the channel detection system applied to the terminal while the associated LTE system works in an unlicensed frequency band, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame, and irrespective of whether the current symbol thereof is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. Therefore, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

Figure 11:
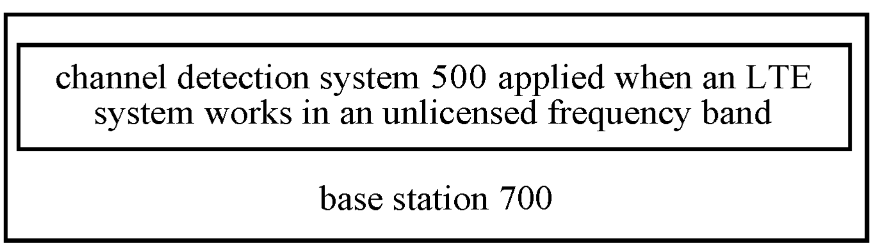
FIG. 11 shows a structural schematic diagram of a base station according to an embodiment of the present invention.

FIG. 11 shows a structural schematic diagram of a base station according to an embodiment of the present invention.

As shown in FIG. 11, the base station 700 according to this embodiment of the present invention comprises a channel detection system 500 applied when an LTE system works in an unlicensed frequency band as described in any of the above technical solutions.

In this technical solution, by means of the channel detection system applied to the base station while the associated LTE system works in an unlicensed frequency band, when a data traffic arrives, the position of a current sub-frame at the arriving time of this data traffic is determined, and a channel detection time is set in the current sub-frame or in a next adjacent sub-frame, irrespective of whether this current sub-frame is an uplink sub-frame, a downlink sub-frame or a special sub-frame, and irrespective of whether the current symbol thereof is a Downlink Pilot Time Slot (DwPTS), a Guard Period (GP) or an Uplink Pilot Time Slot (UpPTS). That is to say, whenever a data traffic arrives, channel state detection would be performed immediately, and once a channel idle state is detected, the data traffic transmission would be performed. Therefore, on the premise that the normal working of the LTE system in the unlicensed frequency band is guaranteed, the time delay of data traffic transmission due to channel state detection at a fixed detection period is effectively reduced, so that data traffic transmission efficiency is improved and at the same time harmonious coexistence of the LTE system and other systems in the unlicensed frequency band is achieved.

Figure 12:
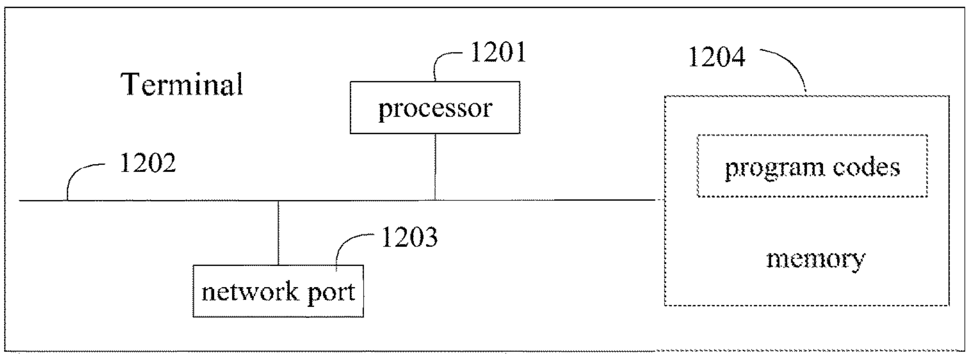
FIG. 12 shows a structural schematic diagram of another terminal according to an embodiment of the present invention.

An embodiment of the present invention also provides another terminal. FIG. 12 shows a structural schematic diagram of such a terminal according to this embodiment of the present invention. As shown in this drawing, this terminal comprises at least one network port 1203, at least one processor 1201 such as a CPU, a memory 1204 and at least one communication bus 1202, wherein the processor 1201 can be equipped with the channel detection system applied when an LTE system works in an unlicensed frequency band as shown in FIG. 9.

Wherein, the communication bus 1202 is for communicably interconnecting the network port 1203, the processor 1201 and the memory 1204.

Wherein, the network port 1203 may comprise a standard wired port or wireless port (such as a Wi-Fi port), and is particularly used for conducting data traffic transmission.

The memory 1204 may be a high-speed RAM memory, or may be a non-volatile memory such as a magnetic disk memory. The memory 1204 stores program codes, and execution of the program codes by the processor 1201 causes the processor 1201 to perform the following operations:

determining a current sub-frame when a data traffic arrives, and setting a channel detection time in the current sub-frame and/or in a next adjacent sub-frame to perform channel state detection; and performing data traffic transmission when it is detected that the channel is in an idle state.

Optionally, when the data traffic arrives, the processor is caused to determine a current symbol of the current sub-frame, and set the channel detection time within the current symbol and/or within a next adjacent symbol to perform the channel state detection.

Optionally, the processor is caused to set a starting point of the channel detection time to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

Optionally, the channel detection time is repeated according to a fixed detection period.

Optionally, the channel detection time is repeated according to a variable detection period.

Optionally, when the data traffic arrives, the processor is caused to determine the channel detection time and perform one time of the channel state detection, and if it is detected that the channel is in an idle state, perform the data traffic transmission; if the channel is detected to be in a busy state, continue performing the channel state detection.

Optionally, before the data traffic arrives, the processor is caused to set channel detection time repeatedly according to a preset fixed detection period; when the data traffic arrives, after the channel detection time is determined, the processor is caused to perform a first time of channel state detection, and if the channel is detected to be in an idle state, perform the data traffic transmission; if the channel is detected to be in a busy state, perform again the channel state detection when reaching a channel detection time point according to the preset fixed detection period, and repeatedly perform the channel state detection according to the preset fixed detection period until the channel is detected to be in an idle state, and then perform the data traffic transmission.

Optionally, when the data traffic is a downlink data traffic, downlink channel state detection is performed by a base station; and when the data traffic is an uplink data traffic, uplink channel state detection is performed by a terminal or a base station.

Optionally, when the base station performs the uplink channel state detection, the processor is caused to judge whether an idle state of the uplink channel is known to the terminal and/or the base station, if it is judged that the idle state of the uplink channel is known to the terminal and/or the base station, the processor is caused to perform the uplink data traffic transmission; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

Optionally, when the channel detection time is over and the channel is detected to be in an idle state, the processor is caused to immediately perform the data traffic transmission, wherein the start time of the data traffic transmission includes a middle point of a symbol or a middle point of a sub-frame.

Optionally, when the channel detection time is over at a point located at a middle point of a current symbol, the processor is caused to start to perform the data traffic transmission at a starting point of a symbol or sub-frame next to the current symbol, and transmit a resource reservation signal or a channel idle state indication signal between the middle point of the current symbol and the starting point of the symbol or sub-frame next to the current symbol.

Optionally, when setting the channel detection time in the current sub-frame or in the current symbol to perform channel state detection, the processor is caused to judge whether the terminal or base station that performs the channel state detection belongs to the same telecommunication operator as the other terminals or base stations.

Further optionally, if it is judged that the terminal or base station that performs the channel state detection belongs to the same telecommunication operator as the other terminals or base stations, the processor is caused to subtract a second power of the other terminals or base stations from a first power of said terminal or base station that performs the channel state detection, so as to attain a third power, and compare the third power with a first channel busy-idle threshold value in order to perform the channel state detection; or, set a second channel busy-idle threshold value according to the distribution of all the base stations belonging to the same telecommunication operator, and compare the power detected by the terminal or base station with the second channel busy-idle threshold value in order to perform the channel state detection, wherein the second channel busy-idle threshold value includes the power of the other terminals or base stations.

Optionally, when setting the channel detection time in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

Optionally, if downlink data traffic arrives at a base station when the terminal is performing uplink data traffic transmission, the processor is caused to start to perform the channel state detection at a time point that is less than or equal to 4 ms after the arriving time of the downlink data traffic; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the base station performs the channel state detection, the detected power includes the power of the subcarriers used to send the channel occupation signals by the telecommunication operators and/or WIFIs other than the same telecommunication operator that the terminal or the base station belongs to.

Optionally, if uplink data traffic arrives at a terminal when a base station that the terminal belongs to is performing downlink data traffic transmission or another terminal adjacent the terminal is performing uplink data traffic transmission, uplink channel state detection is performed by this terminal, wherein the processor is caused to subtract the power of said base station or the power of said another terminal adjacent the terminal from the power detected by the terminal in order to perform the uplink channel state detection; or, after said base station completes the downlink data traffic transmission or said another terminal adjacent the terminal completes the uplink data traffic transmission, uplink channel state detection is performed by the terminal; or, when the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when the terminal performs the uplink channel state detection, the detected power includes the power of the subcarriers used to send the channel occupation signals by the telecommunication operators and/or WIFIs other than the same telecommunication operator that the terminal belongs to.

In particular, the terminal described in the embodiments of the present invention may be utilized to implement part of or all of the steps of the method embodiments of the present invention described with reference to FIG. 4.

Figure 13:
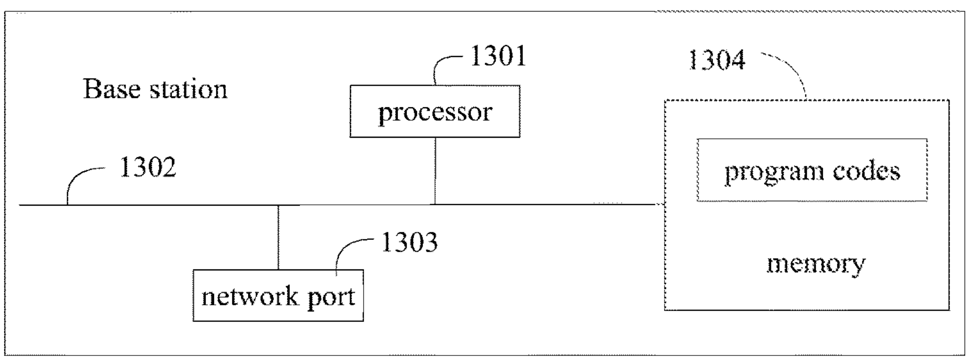
FIG. 13 shows a structural schematic diagram of another base station according to an embodiment of the present invention.

An embodiment of the present invention also provides another base station. FIG. 13 shows a structural schematic diagram of such a base station according to this embodiment of the present invention. As shown in this drawing, this base station comprises at least one network port 1303, at least one processor 1301 such as a CPU, a memory 1304 and at least one communication bus 1302, wherein the processor 1301 can be equipped with the channel detection system applied when an LTE system works in an unlicensed frequency band as shown in FIG. 9.

Wherein, the communication bus 1302 is for communicably interconnecting the network port 1303, the processor 1301 and the memory 1304.

Wherein, the network port 1303 may comprise a standard wired port or wireless port (such as a Wi-Fi port), and is particularly used for conducting data traffic transmission.

The memory 1304 may be a high-speed RAM memory, or may be a non-volatile memory such as a magnetic disk memory. The memory 1304 stores program codes, and execution of the program codes by the processor 1301 causes the processor 1301 to perform the following operations:

determining a current sub-frame when a data traffic arrives, and setting a channel detection time in the current sub-frame and/or in a next adjacent sub-frame to perform channel state detection; and performing data traffic transmission when it is detected that the channel is in an idle state.

Optionally, when the data traffic arrives, the operation of determining a current sub-frame when a data traffic arrives and setting a channel detection time in the current sub-frame and/or in a next adjacent sub-frame to perform channel state detection particularly comprises determining a current symbol of the current sub-frame, and setting the channel detection time within the current symbol and/or within a next adjacent symbol to perform the channel state detection.

Optionally, the processor is caused to set a starting point of the channel detection time to be a starting point or middle point of the current sub-frame and/or of the next adjacent sub-frame, or to be a starting point or middle point of the current symbol and/or of the next adjacent symbol, wherein, the starting point or middle point is arranged after an arriving time point of the data traffic.

Optionally, the channel detection time is repeated according to a fixed detection period.

Optionally, the channel detection time is repeated according to a variable detection period.

Optionally, when the data traffic arrives, the processor is caused to determine the channel detection time and perform one time of the channel state detection, and if it is detected that the channel is in an idle state, perform the data traffic transmission; if the channel is detected to be in a busy state, continue performing the channel state detection.

Optionally, before the data traffic arrives, the processor is caused to set channel detection time repeatedly according to a preset fixed detection period; when the data traffic arrives, after the channel detection time is determined, the processor is caused to perform a first time of channel state detection, and if the channel is detected to be in an idle state, perform the data traffic transmission; if the channel is detected to be in a busy state, perform again the channel state detection when a channel detection time point is reached according to the preset fixed detection period, and repeatedly perform the channel state detection according to the preset fixed detection period until the channel is detected to be in an idle state, and then perform the data traffic transmission.

Optionally, when the data traffic is a downlink data traffic, downlink channel state detection is performed by a base station; and when the data traffic is an uplink data traffic, uplink channel state detection is performed by a terminal or a base station.

Further optionally, when the base station performs the uplink channel state detection, the processor is caused to judge whether an idle state of the uplink channel is known to the terminal and/or the base station, and if it is judged that the idle state of the uplink channel is known to the terminal and/or the base station, the processor is caused to perform the uplink data traffic transmission; if it is judged that the idle state of the uplink channel is not known to the terminal and/or the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

Optionally, when the channel detection time is over and the channel is detected to be in an idle state, the processor is caused to immediately perform the data traffic transmission, wherein the start time of the data traffic transmission includes a middle point of a symbol or a middle point of a sub-frame.

Optionally, when the channel detection time is over at a point located at a middle point of a current symbol, the processor is caused to start to perform the data traffic transmission at a starting point of a symbol or sub-frame next to the current symbol, and transmit a resource reservation signal or a channel idle state indication signal between the middle point of the current symbol and the starting point of the symbol or sub-frame next to the current symbol.

Optionally, when setting the channel detection time in the current sub-frame or in the current symbol to perform channel state detection, the processor is caused to judge whether the terminal or base station that performs the channel state detection belongs to the same telecommunication operator as the other terminals or base stations.

Further optionally, if it is judged that the terminal or base station that performs the channel state detection belongs to the same telecommunication operator as the other terminals or base stations, the processor is caused to subtract a second power of the other terminals or base stations from a first power of said terminal or base station that performs the channel state detection, so as to attain a third power, and compare the third power with a first channel busy-idle threshold value in order to perform the channel state detection; or, set a second channel busy-idle threshold value according to the distribution of all the base stations belonging to the same telecommunication operator, and compare the power detected by the terminal or base station with the second channel busy-idle threshold value in order to perform the channel state detection, wherein the second channel busy-idle threshold value includes the power of the other terminals or base stations.

Optionally, when the channel detection time is set in the current sub-frame or in the current symbol to perform channel state detection, if the channel is occupied by different telecommunication operators and/or WIFIs, the different telecommunication operators and/or WIFIs sends channel occupation signals on different subcarriers, and the subcarrier used to send one channel occupation signal is only used to send the one channel occupation signal; and when a terminal or a base station performs the channel state detection, the detected power includes the power of the subcarriers used to send the channel occupation signals by the telecommunication operators and/or WIFIs other than the same telecommunication operator that the terminal or the base station belongs to, wherein, the subcarrier distribution of said same telecommunication operator is concentrated type or distributed type.

In particular, the base station described in the embodiments of the present invention may be utilized to implement part of or all of the steps of the method embodiments of the present invention described with reference to FIG. 4.

The technical solution of the present invention has been described in detail above with reference to the accompanying drawings. By means of the described technical solution, on the premise that the normal working of the LTE system in the unlicensed frequency band is guaranteed, the time delay of data traffic transmission due to channel state detection at a fixed detection period can be effectively reduced, thereby improving data traffic transmission efficiency and at the same time achieving harmonious coexistence of the LTE system and other systems in the unlicensed frequency band.

The above described is just preferred embodiments of the present invention, and is not intended to limit the present invention. For those skilled in the art, the present invention can have various changes and modifications. Any changes, equivalent substitutions, modifications etc. made within the concept and principle of present invention should be embraced within the protection scope of the present invention.

The invention claimed is:

1. A channel detection method applied when an LTE system works in an unlicensed frequency band, characterized in comprising:

determining a current sub-frame and a channel detection time when a data traffic arrives, wherein the channel detection time is set in at least one of the current sub-frame and a next adjacent sub-frame to perform channel state detection, and judging whether the terminal or base station that performs the channel state detection and other terminals or base stations concurrently performing data transmission with the terminal or base station that performs the channel state detection belong to a same telecommunication operator;

if it is judged that the terminal or base station that performs the channel state detection and other terminals or base stations belong to a same telecommunication operator, subtracting a second power of the other terminals or base stations from a first power detected by said terminal or base station that performs the channel state detection so as to attain a third power, and comparing the third power with a first channel busy-idle threshold value in order to perform the channel state detection; or setting a second channel busy-idle threshold value according to the distribution of all the base stations belonging to the same telecommunication operator, and comparing the power detected by the terminal or base station with the second channel busy-idle threshold value in order to perform the channel state detection, wherein the second channel busy-idle threshold value includes the power of the other terminals or base stations;

and performing data traffic transmission when it is detected that the channel is in an idle state.

2. The channel detection method according to claim 1, characterized in that, when the data traffic arrives, determining a current symbol of the current sub-frame, and setting the channel detection time within at least one of the current symbol and a next adjacent symbol to perform the channel state detection.

3. The channel detection method according to claim 2, characterized in that, setting a starting point of the channel detection time to be a starting point or middle point of at least one of the current sub-frame and the next adjacent sub-frame, or to be a starting point or middle point of at least one of the current symbol and the next adjacent symbol, wherein, the starting point or middle point is arranged after an arriving time point of the data traffic.

4. The channel detection method according to claim 3, characterized in that, the channel state detection is repeated according to a fixed detection period.

5. The channel detection method according to claim 3, characterized in that, the channel state detection is repeated according to a variable detection period.

6. The channel detection method according to claim 5, characterized in that, when the data traffic arrives, determining the channel detection time and performing one time of the channel state detection, and if the channel is detected to be in an idle state, performing the data traffic transmission; if the channel is detected to be in a busy state, continuing performing the channel state detection.

7. The channel detection method according to claim 5, characterized in that, before the data traffic arrives, performing the channel state detection repeatedly according to a preset fixed detection period;

when the data traffic arrives, after the channel detection time is determined, performing a first time of channel state detection, and if the channel is detected to be in an idle state, performing the data traffic transmission; if the channel is detected to be in a busy state, performing again the channel state detection when reaching a fixed channel detection time point according to the preset fixed detection period, and repeatedly performing the channel state detection according to the preset fixed detection period until the channel is detected to be in an idle state, and then performing the data traffic transmission.

8. The channel detection method according to claim 2, characterized in that, when the channel detection time is over at a point located at a middle point of a current symbol, starting to perform the data traffic transmission at a starting point of a symbol or sub-frame next to the current symbol, and transmitting a resource reservation signal or a channel idle state indication signal between the middle point of the current symbol and the starting point of the symbol or sub-frame next to the current symbol.

9. The channel detection method according to claim 1, characterized in that, when the data traffic is a downlink data traffic, downlink channel state detection is performed by a base station; and when the data traffic is an uplink data traffic, uplink channel state detection is performed by a terminal or a base station.

10. The channel detection method according to claim 9, characterized in that, when the base station performs the uplink channel state detection, judging whether an idle state of the uplink channel is known to at least one of the terminal and the base station, if it is judged that the idle state of the uplink channel is known to at least one of the terminal and the base station, performing the uplink data traffic transmission;

if it is judged that the idle state of the uplink channel is not known to both the terminal and the base station, the terminal notifies the base station of the arrival of an uplink data traffic by sending a detection reference signal in short cycles, or sending an uplink scheduling request signal, or sending a cache status report to the base station, so as to cause the base station to perform the uplink channel state detection, wherein the uplink scheduling request signal or the cache status report is sent in an unlicensed frequency band or in a licensed frequency band.

11. The channel detection method according to claim 1, characterized in that, when the channel detection time is over and the channel is detected to be in an idle state, immediately performing the data traffic transmission, wherein the start time of the data traffic transmission includes a middle point of a symbol or a middle point of a sub-frame.

12. The channel detection method according to claim 1, characterized in that, if it is judged that the terminal or base station that performs the channel state detection and other terminals or base stations belong to different telecommunication operators, the different telecommunication operators send channel occupation signals on subcarriers different from each other, and a subcarrier used to send one channel occupation signal is only used to send the one channel occupation signal; and when a terminal or a base station performs the channel state detection, the detected power includes the power of subcarriers used to send the channel occupation signals by telecommunication operators other than the same telecommunication operator that the terminal or the base station that performs the channel state detection belongs to, wherein, the subcarrier distribution of said same telecommunication operator is concentrated type or distributed type.

13. The channel detection method according to claim 1, characterized in that, if downlink data traffic arrives at a base station when the terminal is performing uplink data traffic transmission, starting to perform the channel state detection at a time point that is less than or equal to 4 ms after the arriving time of the downlink data traffic; or if it is judged that the terminal or base station that performs the channel state detection and other terminals or base stations belong to different telecommunication operator, the different telecommunication operators and send channel occupation signals on subcarriers different from each other, and a subcarrier used to send one channel occupation signal is only used to send the one channel occupation signal; and when the base station performs the channel state detection, the detected power includes the power of subcarriers used to send the channel occupation signals by telecommunication operators other than the same telecommunication operator that the terminal or the base station that performs the channel state detection belongs to.

14. The channel detection method according to claim 1, characterized in that, if uplink data traffic arrives at a terminal when a base station that the terminal belongs to is performing downlink data traffic transmission or another terminal adjacent the terminal is performing uplink data traffic transmission, performing uplink channel state detection by using the terminal, wherein subtracting the power of said base station or the power of said another terminal adjacent the terminal from the power detected by the terminal in order to perform the uplink channel state detection; or waiting until said base station completes the downlink data traffic transmission or said another terminal adjacent the terminal completes the uplink data traffic transmission, and then performing uplink channel state detection by using the terminal; or if it is judged that the terminal or base station that performs the channel state detection and other terminals or base stations belong to different telecommunication operator, the different telecommunication operators send channel occupation signals on subcarriers different from each other, and a subcarrier used to send one channel occupation signal is only used to send the one channel occupation signal; and when the terminal performs the uplink channel state detection, the detected power includes the power of subcarriers used to send the channel occupation signals by telecommunication operators other than the same telecommunication operator that the terminal that performs the channel state detection belongs to.

15. A terminal, characterized in comprising a communication bus, a network port, a memory and a processor, wherein:

the communication bus is for communicably interconnecting the network port, the memory and the processor;

the network port is for performing data traffic transmission;

the memory stores program codes, and execution of the program codes by the processor causes the processor to determine a current sub-frame and a channel detection time when a data traffic arrives, wherein the channel detection time is set in at least one of the current sub-frame and a next adjacent sub-frame to perform channel state detection, and judging whether the terminal that performs the channel state detection and other terminals or base stations concurrently performing data transmission with the terminal or base station that performs the channel state detection belong to a same telecommunication operator;

if it is judged that the terminal that performs the channel state detection and other terminals or base stations belong to a same telecommunication operator, subtracting a second power of the other terminals or base stations from a first power detected by said terminal that performs the channel state detection so as to attain a third power, and comparing the third power with a first channel busy-idle threshold value in order to perform the channel state detection; or setting a second channel busy-idle threshold value according to the distribution of all the base stations belonging to the same telecommunication operator, and comparing the power detected by the terminal with the second channel busy-idle threshold value in order to perform the channel state detection, wherein the second channel busy-idle threshold value includes the power of the other terminals or base stations;

and perform data traffic transmission when it is detected that the channel is in an idle state.

16. The terminal according to claim 15, characterized in that, when the data traffic arrives, the processor is caused to determine a current symbol of the current sub-frame, and set the channel detection time within at least one of the current symbol and a next adjacent symbol to perform the channel state detection.

17. A base station, characterized in comprising a communication bus, a network port, a memory and a processor, wherein:

the communication bus is for communicably interconnecting the network port, the memory and the processor;

the network port is for performing data traffic transmission;

the memory stores program codes, and execution of the program codes by the processor causes the processor to determine a current sub-frame and a channel detection time when a data traffic arrives, wherein the channel detection time is set in at least one of the current sub-frame and a next adjacent sub-frame to perform channel state detection, and judging whether the base station that performs the channel state detection and other terminals or base stations concurrently performing data transmission with the terminal or base station that performs the channel state detection belong to a same telecommunication operator;

if it is judged that the base station that performs the channel state detection and other terminals or base stations belong to a same telecommunication operator, subtracting a second power of the other terminals or base stations from a first power detected by said base station that performs the channel state detection so as to attain a third power, and comparing the third power with a first channel busy-idle threshold value in order to perform the channel state detection; or setting a second channel busy-idle threshold value according to the distribution of all the base stations belonging to the same telecommunication operator, and comparing the power detected by the base station with the second channel busy-idle threshold value in order to perform the channel state detection, wherein the second channel busy-idle threshold value includes the power of the other terminals or base stations;

and perform data traffic transmission through the network port when it is detected that the channel is in an idle state.

18. The base station according to claim 17, characterized in that, when the data traffic arrives, the processor is caused to determine a current symbol of the current sub-frame, and set the channel detection time within at least one of the current symbol and a next adjacent symbol to perform the channel state detection.

* * * * *